US011932752B2

(12) United States Patent
Hersam et al.

(10) Patent No.: US 11,932,752 B2
(45) Date of Patent: Mar. 19, 2024

(54) PHASE-INVERSION POLYMER COMPOSITE MATERIAL, FABRICATING METHODS AND APPLICATIONS OF SAME

(71) Applicant: NORTHWESTERN UNIVERSITY, Evanston, IL (US)

(72) Inventors: Mark C. Hersam, Wilmette, IL (US); Ana Carolina Mazarin de Moraes, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 144 days.

(21) Appl. No.: 17/626,602

(22) PCT Filed: Jul. 24, 2020

(86) PCT No.: PCT/US2020/043370
§ 371 (c)(1),
(2) Date: Jan. 12, 2022

(87) PCT Pub. No.: WO2021/045850
PCT Pub. Date: Mar. 11, 2021

(65) Prior Publication Data
US 2022/0243036 A1 Aug. 4, 2022

Related U.S. Application Data

(60) Provisional application No. 62/878,946, filed on Jul. 26, 2019.

(51) Int. Cl.
*C08K 9/02* (2006.01)
*C08K 3/04* (2006.01)
*C08K 3/38* (2006.01)

(52) U.S. Cl.
CPC .................. *C08K 9/02* (2013.01); *C08K 3/04* (2013.01); *C08K 3/38* (2013.01); *C08K 2003/385* (2013.01)

(58) Field of Classification Search
CPC ... C08K 9/02; C08K 3/04; C08K 3/38; C08K 2003/385; C08J 5/18; C08J 2327/16
USPC ....................................................... 523/205
See application file for complete search history.

(56) References Cited

U.S. PATENT DOCUMENTS

| 9,859,034 B2* | 1/2018 | Sjong .................... C04B 35/583 |
| 2010/0279201 A1 | 11/2010 | Mofakhami |
| 2019/0123324 A1 | 4/2019 | Dushatinski et al. |

FOREIGN PATENT DOCUMENTS

| CN | 102502535 B | 6/2013 |
| EP | 3451414 A1 | 3/2019 |

OTHER PUBLICATIONS

B. Scrosati, J. Hassoun, Y.-K. Sun, Energy Environ. Sci. 2011, 4, 3287.
J. M. Tarascon, M. Armand, Nature, 2001, 414, 359.
J. B. Goodenough, K.-S. Park, J. Am. Chem. Soc. 2013, 135, 1167.
M. Winter, R. J. Brodd, Chem. Rev. 2004, 104, 4245.
X. Huang, J. Solid State Chem. 2011, 15, 649.
M. F. Lagadec, R. Zahn, V. Wood, Nat. Energy 2019, 4, 16.
S. S. Zhang, J. Power Sources 2007, 164, 351.
P. Arora, Z. Zhang, Chem. Rev. 2004, 104, 4419.
C. Martinez-Cisneros, C. Antonelli, B. Levenfeld, A. Varez, J. Y. Sanchez, Electrochim. Acta 2016, 216, 68.
W. Jiang, Z. Liu, Q. Kong, J. Yao, C. Zhang, P. Han, G. Cui, Solid State Ion. 2013, 232, 44.
H. Li, D. Wu, J. Wu, L.-Y. Dong, Y.-J. Zhu, X. Hu, Adv. Mater. 2017, 29, 1703548.
Y. Zhai, K. Xiao, J. Yu, B. Ding, Electrochim. Acta 2015, 154, 219.
V. Deimede, C. Elmasides, EnergyTechnol. 2015, 3, 453.
H. Lee, M. Yanilmaz, O. Toprakci, K. Fu, X. Zhang, Energy Environ. Sci. 2014, 7, 3857.
M.-H. Ryou, Y. M. Lee, J.-K. Park, J. W. Choi, Adv. Mater. 2011, 23, 3066.
J. Y. Kim, Y. Lee, D. Y. Lim, Electrochim. Acta 2009, 54, 3714.
J. M. Ko, B. G. Min, D.-W. Kim, K. S. Ryu, K. M. Kim, Y. G. Lee, S. H. Chang, Electrochim. Acta 2004, 50, 367.
X. Zhu, X. Jiang, X. Ai, H. Yang, Y. Cao, ACS Appl. Mater. Interfaces 2015, 7, 24119.
H. Jeon, D. Yeon, T. Lee, J. Park, M.-H. Ryou, Y. M. Lee, J. Power Sources 2016, 315, 161.
J. Dai, C. Shi, C. Li, X. Shen, L. Peng, D. Wu, D. Sun, P. Zhang, J. Zhao, Energy Environ. Sci. 2016, 9, 3252.
M. Wang, X. Chen, H. Wang, H. Wu, X. Jin, C. Huang, J. Mater. Chem. A 2017, 5, 311.
L. Jiang, X. Zhang, Y. Chen, L. Qiao, X. Lu, X. Tian, Mater. Chem. Phys. 2018, 219, 368. .
A. J. Blake, R. R. Kohlmeyer, J. O. Hardin, E. A. Carmona, B. Maruyama, J. D. Berrigan, H. Huang, M. F. Durstock, Adv. Energy Mater. 2017, 7, 1602920.
D. Deepika, L. H. Li, A. M. Glushenkov, S. K. Hait, P. Hodgson, Y. Chen, Sci. Rep. 2014, 4, 7288.
C. R. Dean, A. F. Young, I. Meric, C. Lee, L. Wang, S. Sorgenfrei, K. Watanabe, T. Taniguchi, P. Kim, K. L. Shepard, J. Hone, Nat. Nanotechnol. 2010, 5, 722.
Y. Liu, Y. Qiao, Y. Zhang, Z. Yang, T. Gao, D. Kirsch, B. Liu, J. Song, B. Yang, L. Hu, Energy Storage Mater. 2018, 12, 197.
M. Waqas, S. Ali, W. Lv, D. Chen, B. Boateng, W. He, Adv. Mater. Interfaces 2019, 6, 1801330.
W. Luo, L. Zhou, K. Fu, Z. Yang, J. Wan, M. Manno, Y. Yao, H. Zhu, B. Yang, L. Hu, Nano Lett. 2015, 15, 6149.
L. Niu, J. N. Coleman, H. Zhang, H. Shin, M. Chhowalla, Z. Zheng, Small 2016, 12, 272.
H. Xie, Z. Tang, Z. Li, Y. He, H. Wang, Y. Liu, J. Solid State Electrochem. 2008, 12, 1497.

(Continued)

*Primary Examiner* — Hannah J Pak
(74) *Attorney, Agent, or Firm* — Locke Lord LLP; Tim Tingkang Xia, Esq.

(57) ABSTRACT

A composite film usable as a separator of an electrochemical device includes hBN nanosheets and at least one polymer. The hBN nanosheets are uniformly dispersed within a matrix of said least one polymer to achieve a highly porous microstructure. Said at least one polymer comprises one or more electrically insulating and electrochemically inert polymers.

19 Claims, 14 Drawing Sheets

(56) References Cited

OTHER PUBLICATIONS

C. M. Hansen, Hansen Solubility Parameters: A User's Handbook, CRC Press, Boca Raton, FL, USA 2007.
P. Raghavan, X. Zhao, J.-K. Kim, J. Manuel, G. S. Chauhan, J.-H. Ahn, C. Nah, Electrochim. Acta 2008, 54, 228.
L. Wang, N. Deng, J. Ju, G. Wang, B. Cheng, W. Kang, Electrochim. Acta 2019, 300, 263.
Y. Xie, H. Zou, H. Xiang, R. Xia, D. Liang, P. Shi, S. Dai, H. Wang, J. Membrane Sci. 2016, 503, 25.
H. Kato, K. Nishikawa, Y. Koga, J. Phys. Chem. B 2008, 112, 2655.
Z. Liu, T. Cui, T. Lu, M. S. Ghazvini, F. Endres, J. Phys. Chem. C 2016, 120, 20224.
K. Dong, S. Zhang, D. Wang, X. Yao, J. Phys. Chem. A 2006, 110, 9775.
S. Zhang, J. Cao, N. Ma, M. You, X. Wang, J. Meng, Appl. Surf. Sci. 2018, 428, 41.
N. Kostoglou, K. Polychronopoulou, C. Rebholz, Vacuum 2015, 112, 42.
B. Yu, W. Xing, W. Guo, S. Qiu, X. Wang, S. Lo, Y. Hu, J. Mater. Chem. A 2016, 4, 7330.
J. Kalhoff, G. G. Eshetu, D. Bresser, S. Passerini, ChemSusChem 2015, 8, 2154.
Z. Lu, L. Yang, Y. Guo, J. Power Sources 2006, 156, 555.
J. Le Bideau, L. Viau, A. Vioux, Chem. Soc. Rev. 2011, 40, 907.
M. J. Marczewski, B. Stanje, I. Hanzu, M. Wilkening, P. Johansson, Phys. Chem. Chem. Phys. 2014, 16, 12341.
J. Ding, Y. Kong, P. Li, J. Yang, J. Electrochem. Soc. 2012, 159, A1474.
Korean Intellectual Property Office (ISR/KR), "International Search Report for PCT/US2020/043370", Korea, dated Mar. 26, 2021.
Yu, Y. et al., "Superhydrophobic and Superoleophilic Porous Boron Nitride Nanosheet/Polyvinylidene Fluoride Composite Material for Oil-Polluted Water Cleanup", Adv. Mater. Interfaces, 2014, vol. 1400267, pp. 1-10.
De Moraes, Ana C. M. et al., "Phase-Inversion Polymer Composite Separators Based on Hexagonal Boron Nitride Nanosheets for High-Temperature Lithium-Ion Batteries", ACS Appl. Mater. Interfaces, Jan. 23, 2020, vol. 12, pp. 8107-8114.

* cited by examiner

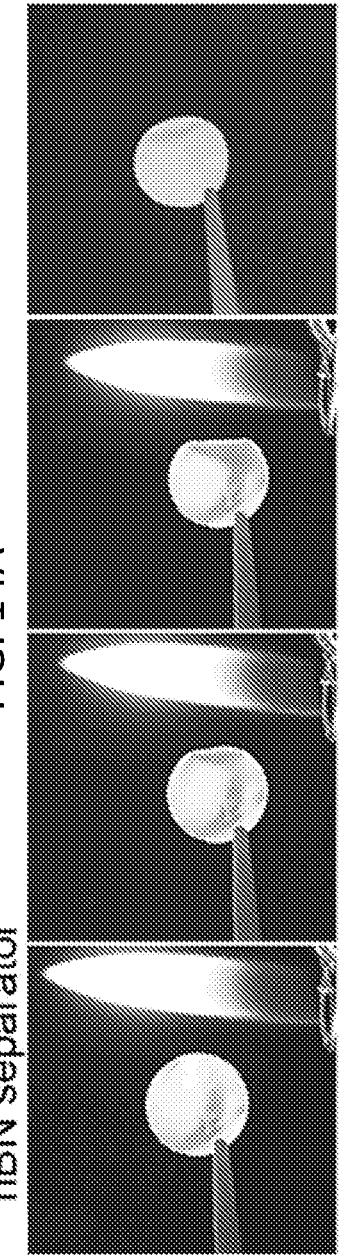
FIG. 14A hBN separator
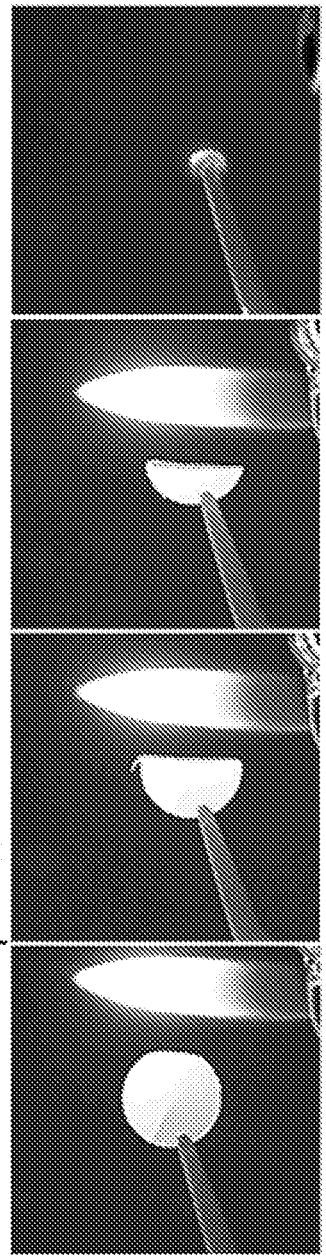
FIG. 14B PP/PE/PP separator
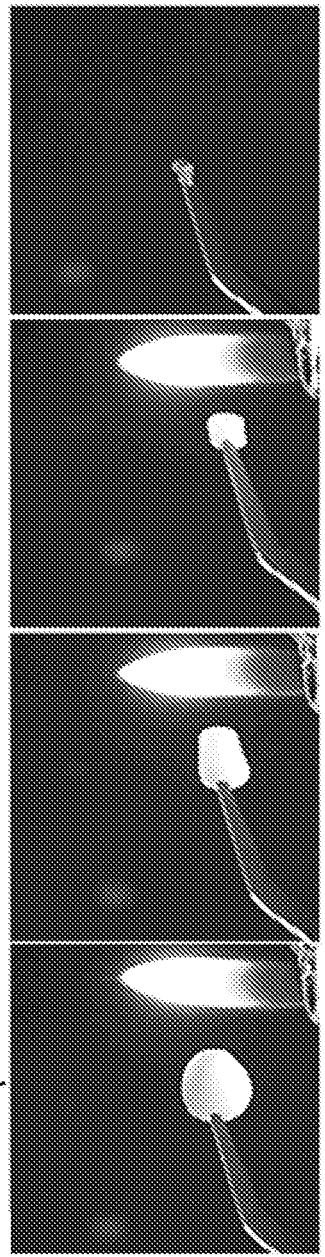
FIG. 14C PE separator

PHASE-INVERSION POLYMER COMPOSITE MATERIAL, FABRICATING METHODS AND APPLICATIONS OF SAME

CROSS-REFERENCE TO RELATED PATENT APPLICATION

This application claims priority to and the benefit of U.S. Provisional Application No. 62/878,946, filed Jul. 26, 2019, which is incorporated herein in its entirety by reference.

STATEMENT AS TO RIGHTS UNDER FEDERALLY-SPONSORED RESEARCH

This invention was made with government support under 1720139 awarded by the National Science Foundation, and DE-AC02-06CH11357 awarded by the Department of Energy. The government has certain rights in the invention.

FIELD OF THE INVENTION

The present invention relates generally to materials, and more particularly to phase-inversion polymer composite battery separators based on two-dimensional insulators, fabricating methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

The high energy density and lightweight design of rechargeable lithium-ion batteries (LIBs) have enabled the rapid ascent of portable electronics, electric vehicles, wireless power tools, and large-scale energy storage systems. LIBs generate electrical energy through the conversion of chemical energy via electrochemical reactions at the anode and cathode electrodes. A key component of a LIB is the electrically insulating separator, which physically prevents electrical contact between the two electrodes while also facilitating ion transport during charge and discharge by providing pathways for ionic conduction throughout an interconnected porous structure.

Since the separator plays a key role in ion transport, it influences LIB performance, cycle life, and safety. For optimal LIB operation, the separator needs to meet several requirements including: (1) high chemical and electrochemical stability to resist degradation due to reactivity with the electrolyte and electrodes under strong oxidizing and reducing conditions; (2) high porosity to provide interconnected pathways for efficient ion transport; (3) high wettability to absorb and retain a significant amount of liquid electrolyte during cell operation; (4) thermal resistance to ensure safe operation at increased temperatures and during local temperature changes.

Commercial manufacturing of LIBs utilizes polyolefin microporous separators based on polypropylene (PP) and polyethylene (PE). Despite their high chemical and mechanical stability and relatively low cost, these conventional polymer membranes have inherent drawbacks including low wettability towards polar liquid electrolytes, which imposes limits on the performance of LIB cells. In addition, polyolefin separators possess relatively low glass transition temperatures that result in shrinkage and compromised mechanical integrity, which ultimately leads to internal electrical shorting and catastrophic LIB failure modes at elevated temperatures.

Considerable research has been devoted to overcoming these challenges in an effort to improve the performance and safety of separators. For instance, the intrinsic hydrophobicity of polyolefins has been modified by grafting hydrophilic monomers or functional groups on the membrane surfaces, achieving improved hydrophilicity for efficient electrolyte wetting. Alternatively, ceramic particle coatings (e.g., $SiO_2$ or $Al_2O_3$) on the surface of polyolefin membranes lead to improved electrolyte wettability and thermal stability. However, these ceramic particle coatings require the use of organic binders that still limit the maximum safe operating temperature while also lowering membrane porosity. Moreover, due to relatively weak interactions with the polymer host and membrane swelling upon exposure to the electrolyte, coating delamination often occurs during electrochemical cycling, which limits battery cycle life. Nonwoven separators based on natural and synthetic fibers have also been reported including the use of electro spun thermosetting polymers that provide improved thermal stability, but these structures lack uniform pore size distribution due to macroscale porosity. In addition to ceramic particle coatings on conventional polymer separators, composite membranes have been produced by direct incorporation of inorganic particles such as $SiO_2$, $Al_2O_3$, MgO, and $TiO_2$ into a polymer matrix to promote enhanced mechanical strength, wettability, ionic conductivity, and thermal resistance.

Therefore, a heretofore unaddressed need exists in the art to address the aforementioned deficiencies and inadequacies.

SUMMARY OF THE INVENTION

One of the objectives of this invention is to provide phase-inversion composite films/separators based on carbon-coated hexagonal boron nitride (hBN) nanosheets and one or more electrically insulating and electrochemically inert polymers such as polyvinylidene fluoride (PVDF) polymers that possess high porosity, electrolyte wettability, and thermal stability. The carbon-coated hBN nanosheets are prepared by a scalable liquid-phase shear exfoliation method using ethyl cellulose (EC) as a polymer stabilizer and source of the carbon coating following thermal pyrolysis. When incorporated within the polymer (e.g., PVDF) matrix, the carbon-coated hBN nanosheets promote favorable interfacial interactions during the phase-inversion process, resulting in porous, flexible, free-standing composite separators. The unique chemical composition of these carbon-coated hBN separators implies high wettability towards a range of liquid electrolytes with near-zero contact angles. This combination of high porosity and electrolyte wettability enables enhanced ionic conductivity and lithium-ion battery electrochemical performance that exceeds incumbent polyolefin separators over a wide range of operating conditions. The hBN nanosheets also impart high thermal stability, providing structural integrity at high temperatures and safe lithium-ion battery operation up to about 120° C. In some embodiments, the stable and safe operation temperature can be up to about 145° C.

In one aspect, the invention relates to a composite film usable as a separator of an electrochemical device. In one embodiment, the composite film includes hBN nanosheets and at least one polymer. The hBN nanosheets are uniformly dispersed within a matrix of said least one polymer to achieve a highly porous microstructure. Said at least one polymer comprises one or more electrically insulating and electrochemically inert polymers.

In one embodiment, the hBN nanosheets comprise exfoliated hBN nanosheets. In one embodiment, the exfoliated hBN nanosheets are formed from bulk hBN by a liquid-phase shear exfoliation process with a polymer stabilizer of ethyl cellulose, and followed by thermal pyrolysis, thereby resulting in a carbon coating on the hBN nanosheets.

In one embodiment, the hBN nanosheets are carbon-coated hBN nanosheets. In one embodiment, the carbon coating of the hBN nanosheets comprises carbonaceous species composed of C—C and oxygen-containing groups.

In one embodiment, the composite film has a porosity in a range of about 47-70%.

In one embodiment, the composite film is thermally stable with structural integrity at an operation temperature up to about 145° C.

In one embodiment, said at least one polymer comprises PVDF, poly(vinylidene fluoride-co-hexafluoropropylene) (PVDF-HFP), poly(vinylidene fluoride-co-trifluoroethylene) (PVDF-TrFE), polyethylene oxide (PEO), polyphenylsulfone (PPSU), perfluorosulfonic acid (PFSA), poly(acrylic acid) (PAA), polyacrylonitrile (PAN), polyethylene terephthalate (PET), polyimide (PI), poly(m-phenyleneisophthalamide) (PMIA), polymethylmethaacrylate (PMMA), polyurethane (PU), polyurethane acrylate (PUA), poly(ethylene glycol) diacrylate (PEGDA), polyvinylchloride (PVC), polystyrene (PS), polyethylene (PE), polypropylene (PP), poly(vinyl alcohol) (PVA), polytetrafluoroethylene (PTFE), polyethylene terephthalate (PET), polydopamine (PDA), polyetherimide (PEI), poly(hydroxyethyl acrylate-co-acrylonitrile) (PHEA-co-AN), poly(methyl methacrylate-acrylonitrile-vinyl acetate (PMMA-AN-VAc), poly(acrylonitrile-co-butyl acrylate) (PAN-co-BuA), polyacrylonitrile-methyl methacrylate (PAN-MMA), polybenzoxazole, polyfluorosilicones, or combinations of them.

In one embodiment, said at least one polymer comprises PVDF. In one embodiment, the composite film has a ratio of the hBN nanosheets to PVDF is about 1:1 by weight.

In another aspect, the invention relates to a battery comprising a separator. The separator comprises the composite film as disclosed above.

In one embodiment, the separator has ionic conductivity that increases as a temperature increases.

In one embodiment, the ionic conductivity is in a range of about 0.75-1.25 mS cm$^{-1}$ at room temperature, and about 1.36-2.0 mS cm$^{-1}$ at the temperature of about 60° C.

In one embodiment, the separator has an electrolyte uptake in a range of about 280-420%.

In yet another aspect, the invention relates to a fuel cell, comprising a membrane comprising the composite film as disclosed above.

In a further aspect, the invention relates to an electrochemical device comprising a member comprising the composite film as disclosed above.

In one aspect, the invention relates to composite material comprising hBN nanosheets and at least one polymer. Said at least one polymer is one or more electrically insulating and electrochemically inert polymers. The composite material possesses high porosity, electrolyte wettability, and thermal stability.

In one embodiment, the hBN nanosheets comprise exfoliated hBN nanosheets.

In one embodiment, the exfoliated hBN nanosheets are formed from bulk hBN by a liquid-phase shear exfoliation process with a polymer stabilizer of ethyl cellulose, and followed by thermal pyrolysis, thereby resulting in a carbon coating on the hBN nanosheets.

In one embodiment, the hBN nanosheets are carbon-coated hBN nanosheets.

In one embodiment, the carbon coating of the hBN nanosheets comprises carbonaceous species composed of C—C and oxygen-containing groups.

In one embodiment, said at least one polymer comprises PVDF, PVDF-HFP, PVDF-TrFE, PEO, PPSU, PFSA, PAA, PAN, PET, PI, PMIA, PMMA, PU, PUA, PEGDA, PVC, PS, PE, PP, PVA, PTFE, PET, PDA, PEI, PHEA-co-AN, PMMA-AN-VAc, PAN-co-BuA, PAN-MMA, polybenzoxazole, polyfluorosilicones, or combinations of them.

In one embodiment, said at least one polymer comprises PVDF.

In one embodiment, the composite material has a ratio of the hBN nanosheets to PVDF is about 1:1 by weight.

In another aspect, the invention relates to an electrochemical device comprising a member formed of the composite material as disclosed above.

In one embodiment, the electrochemical device is a battery, a supercapacitor, or a fuel cell.

In another aspect, the invention relates to a method for fabricating a composite film. In one embodiment, the method comprises providing a solution containing hexagonal boron nitride (hBN) nanosheets and at least one polymer, said at least one polymer being one or more electrically insulating and electrochemically inert polymer; depositing the solution on a substrate to form a film thereon; and drying the film with a phase-inversion process, so as to result in a porous and free-standing composite film.

In one embodiment, the hBN nanosheets comprise exfoliated hBN nanosheets formed from bulk hBN by a liquid-phase shear exfoliation process with a polymer stabilizer of ethyl cellulose, and followed by thermal pyrolysis, thereby resulting in a carbon coating on the hBN nanosheets.

In one embodiment, the providing step comprises dispersing the hBN nanosheets in a solvent to form a homogeneous mixture; and adding said at least one polymer and an non-solvent into the homogeneous mixture to obtain the solution.

In one embodiment, the solvent contains N-methyl-2-pyrrolidone (NMP), dimethylformamide, dimethylsulfoxide, dimethylacetamide, tetrahydroxofuran, 1,4-dioxane, methyl ethyl ketone, methyl isobutyl ketone, benzaldehyde, cyclohexanone, acetone, dichloromethane, tetramethylurea, hexamethylphosphoramide, triethylphosphate, trimethylphosphate, N, N-dimethylacetamide or combinations of them, and the non-solvent contains glycerol (natural or synthetic), polyglycerols (e.g., diglycerol, triglycerol, tetraglycerol, etc), polyols such as ethylene glycol, propylene glycol, sugar alcohols (e.g., mannitol, maltitol, sorbitol, xylitol, erythritol, isomalt, etc.), and polymeric polyols (e.g., polyethylene oxide, polyethylene glycol, polypropylene glycol, polyvinyl alcohol, etc.), sodium lactate, vegetable oils (coconut oil, soy bean oil, etc) and butters (e.g., cocoa, shea, polyphenols, etc), glycerol derivatives such as glycerol esters (e.g., glyceryl monostearate, glyceryl distearate, etc), ethers, acetal and ketals, or combinations of them. In one embodiment, the solvent contains NMP, and the non-solvent contains glycerol. In one embodiment, a ratio of NMP/glycerol is from about 85/15 w/w to about 99/1 w/w.

In one embodiment, the solution contains total solid content of about 20 wt % hBN to 60 wt % hBN and 40 wt % polymer to 80 wt % polymer, preferably 50 wt % hBN and 50 wt % polymer.

In one embodiment, the drying step comprises evaporating the solvent from the deposited film at a first temperature; and vacuum annealing the evaporated film at a second temperature to remove the non-solvent. In one embodiment, the first temperature is less than the second temperature.

In one embodiment, the depositing step is performed by blade coating, spin coating, slot-die coating, bar coating, casting, and/or drop casting.

In one embodiment, said at least one polymer comprises PVDF, PVDF-HFP, PVDF-TrFE, PEO, PPSU, PFSA, PAA, PAN, PET, PI, PMIA, PMMA, PU, PUA, PEGDA, PVC, PS, PE, PP, PVA, PTFE, PET, PDA, PEI, PHEA-co-AN, PMMA-AN-VAc, PAN-co-BuA, PAN-MMA, polybenzoxazole, polyfluorosilicones, or combinations of them.

In one embodiment, the method is free of plasticizers as pore formation agents and devoid of processing steps including stretching, etching, or immersion in coagulation bath, thereby allowing for direct use of the free-standing composite film immediately after drying.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1A: The hBN/PVDF solution is prepared by dispersing the previously annealed EC-exfoliated hBN nanosheet powder and PVDF polymer in a 95:5 ratio of N-methyl-2-pyrrolidone and glycerol. FIG. 1B: The hBN/PVDF solution is then blade-coated on a glass substrate followed by drying to promote phase-inversion by sequential removal of the solvent and non-solvent. The hBN nanosheet composite precipitates during this process, ultimately forming a porous and free-standing film. FIG. 1C: Top-view and cross-sectional scanning electron microscopy (SEM) images of the as-prepared hBN nanosheet composite separator.

FIG. 2B: Photographs of liquid electrolyte droplets placed on the surface of each sample, taken after 3 min of exposure. Contact angle images for hBN nanosheet composite separator (FIG. 2C) and commercial PP/PE/PP separator (FIG. 2D). In particular, a 3 µL liquid electrolyte drop was deposited on the surface of each film, and photographs were taken after 1 s (upper row) and 20 s (lower row).

FIG. 3A: Scanning electron micrograph captured at the top surface of the annealed hBN/EC powder. FIG. 3B: XPS survey spectra of the annealed hBN/EC powder and the hBN nanosheet composite separator. FIG. 3C: Atomic composition of the annealed hBN/EC powder and the hBN nanosheet composite separator. FIG. 3D: High-resolution C 1 s XPS scan for the annealed hBN/EC powder (lower plot) and the hBN nanosheet composite separator (upper plot).

FIG. 4A: Rate capability performance tests from 0.1 C to 5 C. FIG. 4B: Charge-discharge voltage profiles at 0.1 C and 5 C rate. FIG. 4C: Cycle life performance tests at 0.5 C. FIG. 4D: Charge-discharge voltage profiles after 100 cycles at 0.5 C.

FIG. 5A shows thermal properties of the hBN nanosheet composite separator and commercial PE separator. Photographs were taken after heating the samples on a hot plate for 5 min at each temperature. FIGS. 5B-5C are respectively cycling performance tests and voltage profiles for LTO|Li half-cells cycled at 0.2 C and about 120 ° C. using the hBN nanosheet composite separator and commercial PE separator with LiTFSI in EMIM-TFSI ionic liquid as the electrolyte.

FIGS. 14A-14C show flame combustion tests of hBN nanosheet composite separator (FIG. 14A) according to embodiments of the invention, PP/PE/PP separator (FIG. 14B), and PE separator (FIG. 14C), respectively. Photographs were taken after each sample was exposed to the flame for approximately 8 sec. The photographs show that the heating caused minor folding to the exposed edge of the hBN nanosheet composite separator. After extinguishing the fire, the hBN nanosheet composite separator maintained its original dimensions, whereas the polyolefin separators were completely burned.

DETAILED DESCRIPTION OF THE INVENTION

Figure 1A:
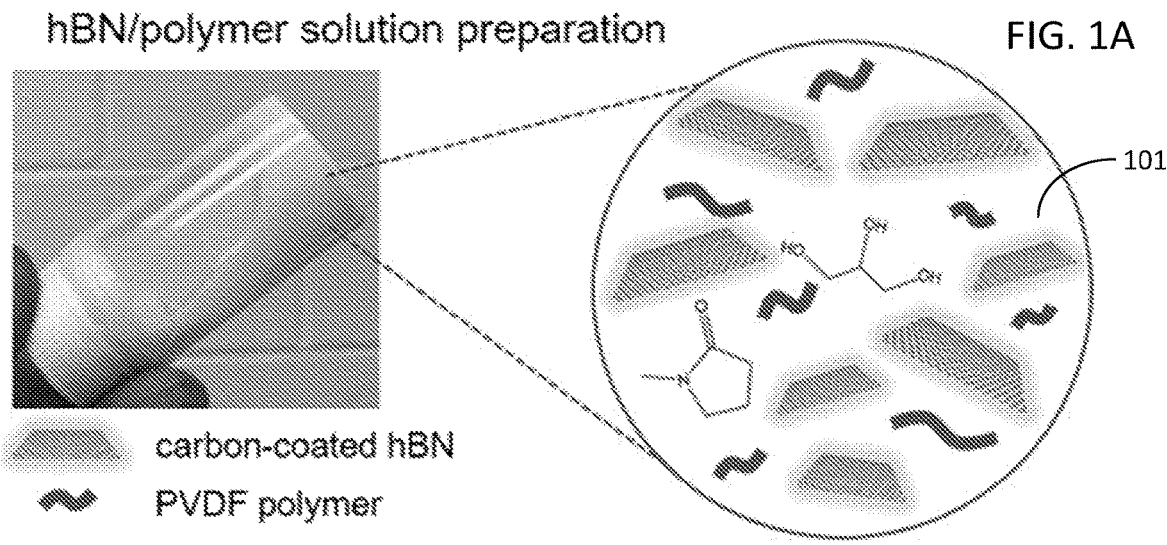
FIGS. 1A-1C show schematically fabrication process of an hBN nanosheet composite separator according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a component" includes a plurality of such components and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures.

It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

By preventing electrical contact between anode and cathode electrodes while facilitating ionic transport, separators play a crucial role in the safe operation of rechargeable battery technologies. However, traditional polymer-based separators have limited thermal stability, which has contributed to catastrophic thermal runaway failure modes that have conspicuously plagued lithium-ion batteries.

Hexagonal boron nitride (hBN), which is an electrically insulating isomorph of graphene, has attracted attention as a ceramic filler because of its high thermal conductivity, chemical inertness, and mechanical robustness. Moreover, hBN is free of dangling bonds or surface charge traps. In the context of battery separators, hBN has been incorporated into polymer matrices such as polyethylene (PE) and polyvinylidene fluoride-hexafluoropropylene (PVDF-HFP) to create composite separators with improved thermal homogeneity that promotes uniform nucleation and growth of lithium metal while enhancing electrochemical performance. hBN has also been coated on the surface of commercial polyolefin separators to increase the stability of lithium metal anodes Similar to other 2D materials, large quantities of hBN nanosheets can be produced via liquid-phase exfoliation of bulk crystals in solution. The nanoscale size of exfoliated hBN has the potential to enable more homogeneous composites with reduced thickness in addition to providing higher surface area for interaction with the solvent/polymer system.

This invention in certain aspects discloses phase-inversion composite separators based on carbon-coated hBN nanosheets and PVDF polymers that possess high porosity, electrolyte wettability, and thermal stability. The carbon-coated hBN nanosheets are prepared by a scalable liquid-phase shear exfoliation method using ethyl cellulose (EC) as a polymer stabilizer and source of the carbon coating following thermal pyrolysis. When incorporated within the PVDF matrix, the carbon-coated hBN nanosheets promote favorable interfacial interactions during the phase-inversion process in which the controlled polymer transforms from a liquid phase to solid phase, resulting in porous, flexible, free-standing composite separators. The unique chemical composition of these carbon-coated hBN separators implies high wettability towards a range of liquid electrolytes with near-zero contact angles. This combination of high porosity and electrolyte wettability enables enhanced ionic conductivity and lithium-ion battery electrochemical performance that exceeds incumbent polyolefin separators over a wide range of operating conditions. The hBN nanosheets also impart high thermal stability, providing structural integrity at high temperatures and safe lithium-ion battery operation up to about 120° C.

In certain aspects, the invention relates to a composite film usable as a separator of an electrochemical device. The composite film includes hBN nanosheets and at least one polymer. The hBN nanosheets are uniformly dispersed within a matrix of said least one polymer to achieve a highly porous microstructure. .

In some embodiments, the hBN nanosheets comprise exfoliated hBN nanosheets. The exfoliated hBN nanosheets are formed from bulk hBN by a liquid-phase shear exfoliation process with a polymer stabilizer of ethyl cellulose, and followed by thermal pyrolysis, thereby resulting in a carbon coating on the hBN nanosheets. Accordingly, the hBN nanosheets are carbon-coated hBN nanosheets.

In some embodiments, the carbon coating of the hBN nanosheets comprises carbonaceous species composed of C—C and oxygen-containing groups.

In some embodiments, the composite film has a porosity in a range of about 47-70%.

In some embodiments, the composite film is thermally stable with structural integrity at an operation temperature up to about 145° C.

In some embodiments, said at least one polymer is one or more electrically insulating and electrochemically inert polymers comprising PVDF, PVDF-HFP, PVDF-TrFE, PEO, PPSU, PFSA, PAA, PAN, PET, PI, PMIA, PMMA, PU, PUA, PEGDA, PVC, PS, PE, PP, PVA, PTFE, PET, PDA, PEI, PHEA-co-AN, PMMA-AN-VAc, PAN-co-BuA, PAN-MMA, polybenzoxazole, polyfluorosilicones, or combinations of them.

In some embodiments, said at least one polymer comprises PVDF. The composite film has a ratio of the hBN nanosheets to PVDF is about 1:1 by weight.

In another aspect, the invention relates to a battery comprising a separator. The separator comprises the composite film as disclosed above.

The polymer composite separator based on carbon-coated hBN nanosheets is prepared using phase-inversion processing, resulting in superlative porosity, electrolyte wettability, ionic conductivity, and thermal stability. As disclosed in the following example, the electrochemical performance of the hBN nanosheet composite separator shows lithium-ion battery rate capability and cycling stability that exceed commercial polyolefin separators. These hBN nanosheet composite separators also enable stable and safe lithium-ion battery operation at high temperatures up to about 120° C. In some embodiments, the stable and safe operation temperature can be up to about 145° C.

In some embodiments, the separator has ionic conductivity that increases as a temperature increases.

In some embodiments, the ionic conductivity is in a range of about 0.75-1.25mS cm$^{-1}$ at room temperature, and about 1.36-2.0 mS cm$^{-1}$ at the temperature of about 60° C.

In some embodiments, the separator has an electrolyte uptake in a range of about 280-420%. The invention in one aspect also relates to a fuel cell, comprising a membrane comprising the composite film as disclosed above.

The invention in one aspect further relates to an electrochemical device comprising a member comprising the composite film as disclosed above.

In one aspect, the invention relates to composite material comprising hBN nanosheets and at least one polymer. The composite material possesses high porosity, electrolyte wettability, and thermal stability.

In some embodiments, the hBN nanosheets comprise exfoliated hBN nanosheets. The exfoliated hBN nanosheets are formed from bulk hBN by a liquid-phase shear exfoliation process with a polymer stabilizer of ethyl cellulose, and followed by thermal pyrolysis, thereby resulting in a carbon coating on the hBN nanosheets. The hBN nanosheets are carbon-coated hBN nanosheets.

In some embodiments, the carbon coating of the hBN nanosheets comprises carbonaceous species composed of C—C and oxygen-containing groups.

In some embodiments, said at least one polymer is one or more electrically insulating and electrochemically inert polymers comprising PVDF, PVDF-HFP, PVDF-TrFE, PEO, PPSU, PFSA, PAA, PAN, PET, PI, PMIA, PMMA, PU, PUA, PEGDA, PVC, PS, PE, PP, PVA, PTFE, PET, PDA, PEI, PHEA-co-AN, PMMA-AN-VAc, PAN-co-BuA, PAN-MMA, polybenzoxazole, polyfluorosilicones, or combinations of them.

In some embodiments, said at least one polymer comprises PVDF.

In some embodiments, the composite material has a ratio of the hBN nanosheets to PVDF is about 1:1 by weight.

In another aspect, the invention relates to an electrochemical device comprising a member formed of the composite material as disclosed above. In some embodiments, the electrochemical device is a battery, a supercapacitor, or a fuel cell.

In another aspect, the invention relates to a method for fabricating a composite film. The method includes providing a solution containing hBN nanosheets and at least one polymer, said at least one polymer being one or more electrically insulating and electrochemically inert polymer; depositing the solution on a substrate to form a film thereon; and drying the film with a phase-inversion process, so as to result in a porous and free-standing composite film.

In some embodiments, the hBN nanosheets comprise exfoliated hBN nanosheets formed from bulk hBN by a liquid-phase shear exfoliation process with a polymer stabilizer of ethyl cellulose, and followed by thermal pyrolysis, thereby resulting in a carbon coating on the hBN nanosheets.

In some embodiments, the providing step comprises dispersing the hBN nanosheets in a solvent to form a homogeneous mixture; and adding said at least one polymer and an non-solvent into the homogeneous mixture to obtain the solution.

In some embodiments, the solvent contains N-methyl-2-pyrrolidone (NMP), dimethylformamide, dimethylsulfoxide, dimethylacetamide, tetrahydroxofuran, 1,4-dioxane, methyl ethyl ketone, methyl isobutyl ketone, benzaldehyde, cyclohexanone, acetone, dichloromethane, tetramethylurea, hexamethylphosphoramide, triethylphosphate, trimethylphosphate, N, N-dimethylacetamide or combinations of them, and the non-solvent contains glycerol (natural or synthetic), polyglycerols (e.g., diglycerol, triglycerol, tetraglycerol, etc), polyols such as ethylene glycol, propylene glycol, sugar alcohols (e.g., mannitol, maltitol, sorbitol, xylitol, erythritol, isomalt, etc.), and polymeric polyols (e.g., polyethylene oxide, polyethylene glycol, polypropylene glycol, polyvinyl alcohol, etc.), sodium lactate, vegetable oils (coconut oil, soy bean oil, etc) and butters (e.g., cocoa, shea, polyphenols, etc), glycerol derivatives such as glycerol esters (e.g., glyceryl monostearate, glyceryl distearate, etc), ethers, acetal and ketals, or combinations of them. In one embodiment, the solvent contains NMP, and the non-solvent contains glycerol. In some embodiments, a ratio of NMP/glycerol is from about 85/15 w/w to about 99/1 w/w, preferably 95/5 w/w.

In some embodiments, the solution contains total solid content of about 20 wt % hBN to 60 wt % hBN and 40 wt % polymer to 80 wt % polymer, preferably 50 wt % hBN and 50 wt % polymer.

In some embodiments, the drying step comprises evaporating the solvent from the deposited film at a first temperature; and vacuum annealing the evaporated film at a second temperature to remove the non-solvent. In some embodiments, the first temperature is less than the second temperature.

In some embodiments, the depositing step is performed by blade coating, spin coating, slot-die coating, bar coating, casting, and/or drop casting.

In some embodiments, said at least one polymer comprises PVDF, PVDF-HFP, PVDF-TrFE, PEO, PPSU, PFSA, PAA, PAN, PET, PI, PMIA, PMMA, PU, PUA, PEGDA, PVC, PS, PE, PP, PVA, PTFE, PET, PDA, PEI, PHEA-co-AN, PMMA-AN-VAc, PAN-co-BuA, PAN-MMA, polybenzoxazole, polyfluorosilicones, or combinations of them.

In some embodiments, the method is free of plasticizers as pore formation agents and devoid of processing steps including stretching, etching, or immersion in coagulation bath, thereby allowing for direct use of the free-standing composite film immediately after drying.

The composite material according to the invention may have widespread applications in lithium-ion battery separators, capacitor separators, supercapacitor separators, insulating coatings, and so on.

The hBN nanosheet composite separators according to embodiments of the invention have at least the following advantages over the existing separators.

Commercial polyolefin-based battery separators degrade at relatively low temperatures, whereas the hBN nanosheet composite separators are stable at high temperatures due to the superlative thermal and chemical stability of hBN nanosheets.

Previous reports showed that coating conventional polyolefins with ceramic particles can enhance thermal stability. However, these coatings are prone to delaminate from the polymer surface due to swelling when exposed to battery electrolytes. In contrast, the hBN nanosheet composite separators are fabricated by incorporating the hBN nanosheets directly in the polymer matrix, resulting in a single freestanding composite membrane.

Previous reports have attempted to incorporate bulk ceramic particles into the polymer matrix in an effort to improve separator properties. In contrast, the hBN nanosheet composite separators incorporate carbon-coated hBN nanosheets in the polymer matrix, which provide a larger surface area for interaction with the polymer matrix, resulting in a more homogeneous phase-inversion process due to the strong compatibility between the hBN nanosheets and the polymer/solvent system. The resulting improvements in the porosity homogeneity improves the interaction of the separator with liquid electrolytes.

Previous reports have incorporated bulk hBN sheets into the polymer matrix. In contrast, the hBN nanosheets utilize multifunctional cellulosic polymers—namely EC—that promote the liquid-phase exfoliation and stabilization of hBN nanosheets in addition to providing a unique carbon-based surface chemistry that improves interaction with the polymer/solvent system and enhances the separator porosity and wettability towards battery electrolytes.

Desirable porosity in commercial polymer membranes is imparted by the manufacturing process which may include post-processing steps, such as stretching, etching, or dipping in a coagulation bath. However, the hBN nanosheet composite separators are fabricated using a one- step drying process, allowing the resulting membranes to be used directly after drying without additional post-processing.

Commercial polyolefin-based battery separators present low electrolyte wettability due to the non-polar character of polyolefins, whereas the hBN nanosheet composite separators present high wettability towards a range of battery electrolytes, including those with vastly different polarities.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Phase-Inversion Polymer Composite Separators Based on Hexagonal Boron Nitride Nanosheets for High-Temperature Lithium-Ion Batteries This exemplary example demonstrates the fabrication of highly porous lithium-ion battery composite separators based on exfoliated hBN nanosheets and PVDF polymers with superlative electrolyte wettability, ionic conductivity, and thermal stability. The hBN nanosheets are exfoliated using a liquid-phase process based on EC as a polymer stabilizer that results in a carbon coating upon thermal pyrolysis, which promotes strong interfacial interactions with the polymer matrix and enhances wettability for a range of battery electrolytes. By employing phase-inversion during the membrane formation process, a highly porous microstructure is achieved in which the hBN nanosheets are uniformly dispersed within the polymer matrix. Importantly, this processing method is free of plasticizers as pore formation agents and does not require additional processing steps such as stretching, etching, or immersion in coagulation bath, ultimately allowing for the direct use of the freestanding composite separator immediately after drying. The high porosity and electrolyte wettability of these phase-inversion composite separators result in enhanced electrochemical performance in LIB s including improved rate capability and cyclability compared to traditional polyolefin separators. Furthermore, the high hBN content in these composite separators leads to exceptional thermal stability, particularly enabling safe LIB operation at temperatures up to about 120° C. In some embodiments, the stable and safe operation temperature can be up to about 145° C. Overall, this invention will expedite ongoing efforts to improve the safety and operating temperature range of rechargeable LIB technology.

hBN Exfoliation and Carbon-Coated hBN Nanosheets

Figure 6:
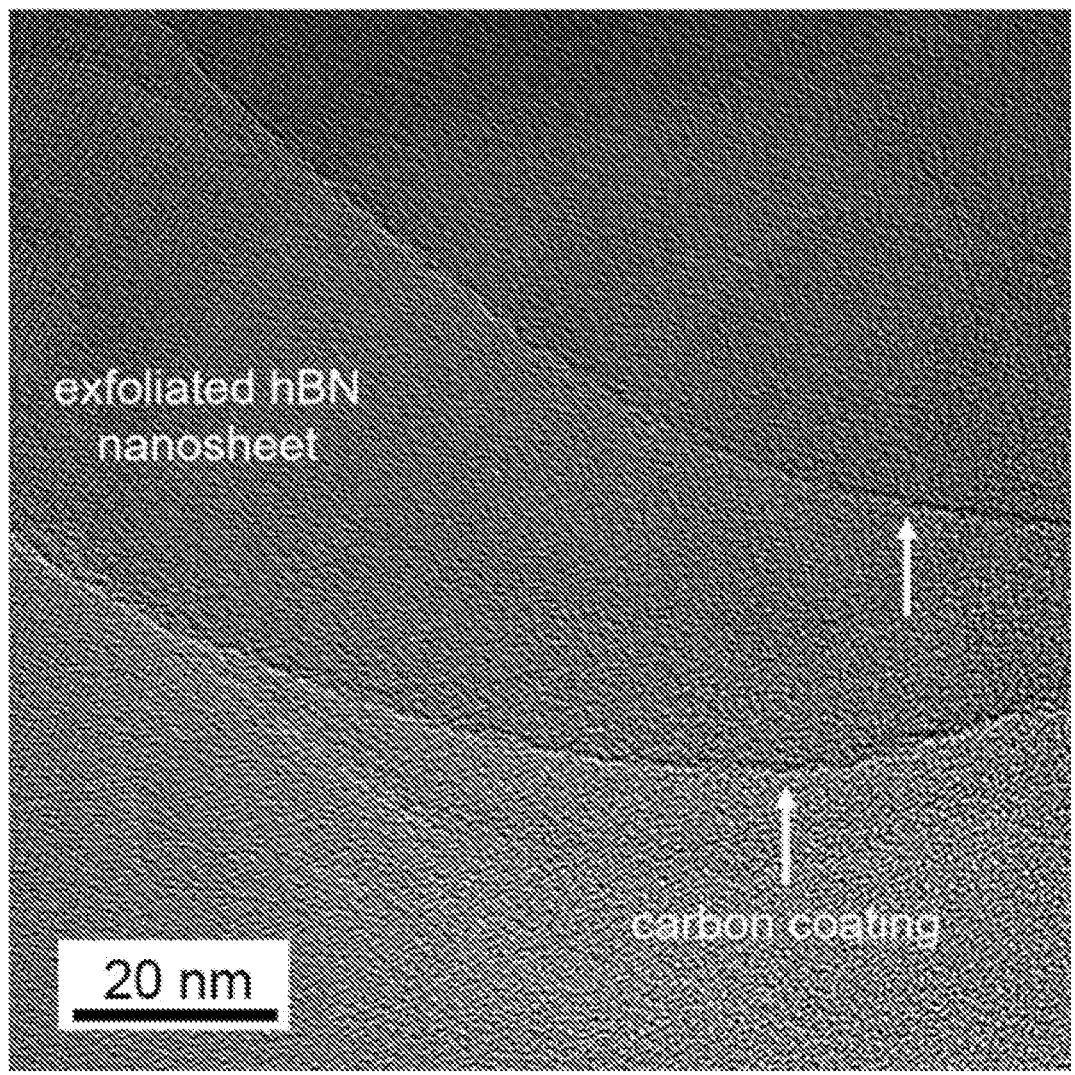
FIG. 6 shows transmission electron microscopy (TEM) image of exfoliated hBN/EC nanosheets after thermal annealing according to embodiments of the invention. The arrows indicate the carbon coating on the hBN nanosheets that results from the pyrolysis of ethyl cellulose.

In the exemplary example, about 120 g of bulk hexagonal boron nitride flakes (hBN, Sigma-Aldrich) were dispersed in an about 0.015 g mL$^{-1}$ ethanolic solution of ethyl cellulose (EC, viscosity 4 cP, Sigma-Aldrich). The solution was then shear mixed (laboratory shear mixer model L5M-A, Silverson) for about 2 h at about 10,230 rpm, followed by centrifugation at about 4,000 rpm for about 20 min (Avanti J-26 XPI centrifuge, JS 7.5 rotor, Beckman Coulter) to sediment out large particles. The supernatant was collected, flocculated with an about 0.04 mg mL$^{-1}$ saline solution to remove excess EC, and centrifuged for about 6 min at about 7,500 rpm to sediment the hBN/EC nanosheets. The isolated solid was washed with water and dried in air to yield the exfoliated hBN/EC powder, which was subsequently annealed in a box furnace at about 400° C. for about 2 h, which results in a nanoscale carbonaceous coating on the hBN nanosheet surface, as shown in FIG. 6.

hBN Nanosheet Composite Separator Fabrication

Figure 1B:
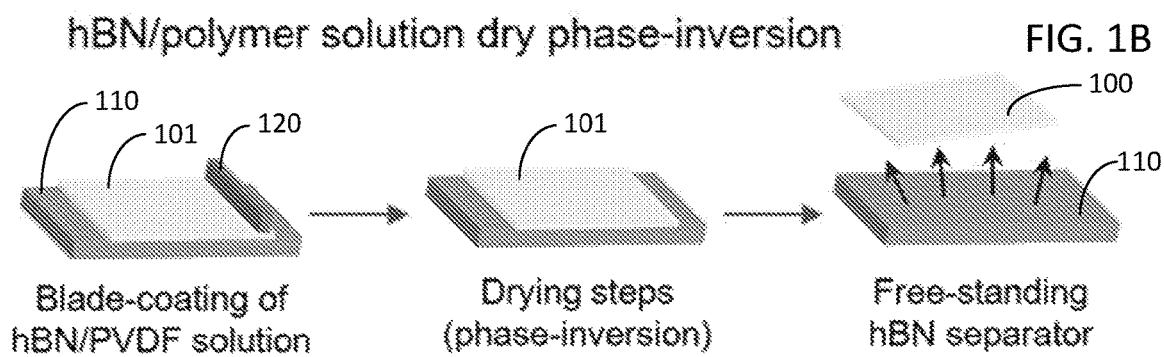

The hBN composite separators were prepared using dry phase-inversion. In particular, exfoliated and annealed hBN/EC powder was dispersed in N-methyl-2-pyrrolidone (NMP, anhydrous, Sigma-Aldrich) by bath sonication for about 2-4 h to form a homogeneous mixture. Next, about 0.17 g polyvinylidene fluoride (PVDF, battery binder grade, MTI Corporation) and glycerol (NMP/glycerol 95/5 w/w) were added to the mixture, obtaining a viscous hBN/PVDF solution with total solid content of about 50 wt % hBN and about 50 wt % PVDF. The mixture was stirred at about 50° C. in a silicone oil bath overnight and allowed to settle for an additional 12 h to avoid bubble formation. As shown in FIG. 1B, the homogeneous hBN/PVDF solution 101 was then blade-coated onto clean, dry, and smooth glass plates 110 using a film casting knife 120 (EQ-Se-KTQ-50 film applicator with adjustable micrometer). The as-casted hBN/PVDF films was immediately transferred to an oven at about 90° C. overnight to remove NMP, followed by vacuum annealing at about 120° C. for about 12 h to remove glycerol. The hBN films were then punched into about 19 mm diameter discs and used to assemble lithium-ion batteries.

In this exemplary example, hBN nanosheets were exfoliated by shear-mixing bulk hBN in ethanol using EC as a polymer stabilizer, as discussed above. The resulting hBN nanosheet/EC powder was then thermally annealed to pyrolyze the EC, which results in a nanoscale carbonaceous coating on the hBN nanosheet surface, as shown in FIG. 6. As disclosed above and shown in FIGS. 1A-1C, the fabrication of hBN nanosheet composite separators was achieved by dry phase-inversion of hBN nanosheets in PVDF, resulting in flexible, porous, free-standing separators. In particular, the carbon-coated hBN nanosheets were dispersed in N-methyl pyrrolidone (NMP) as a solvent followed by the addition of PVDF polymer and glycerol to act as a non-solvent, as shown in FIG. 1A. The hBN/PVDF solution 101 was then blade-coated on a glass substrate 110, as shown in FIG. 1B. The solvent was subsequently evaporated in an oven at about 90° C. overnight, causing the film composition to have a higher non-solvent and hBN/PVDF content. The non-solvent was then removed at about 120° C. under vacuum, leaving behind a porous hBN/PVDF composite film 100, as shown in FIG. 1B. The optimized composition was an about 1:1 ratio of hBN:PVDF, resulting in composite films with suitable porosity, thickness, and mechanical flexibility for application as a LIB separator.

Figure 1C:
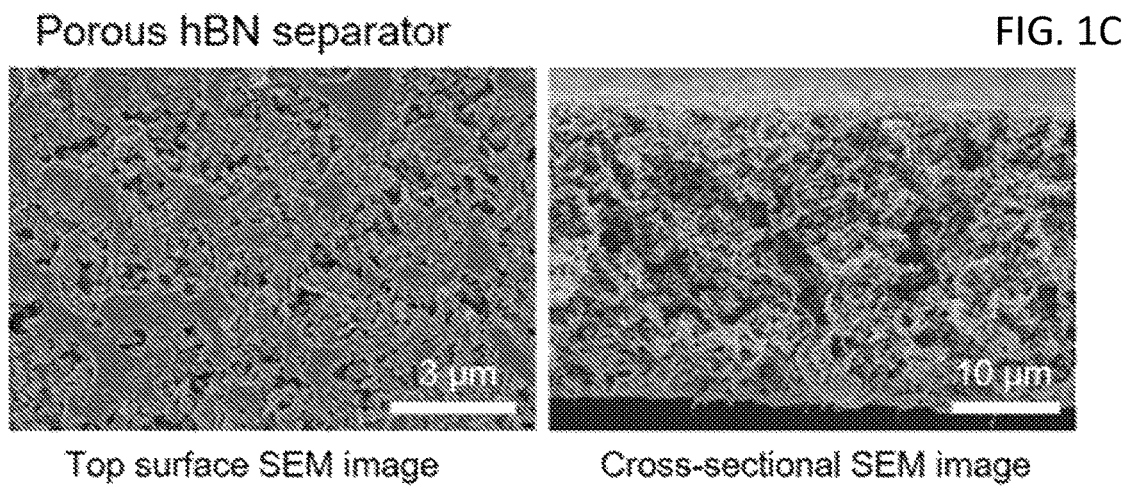
Figures 7A, 7B, 7C:
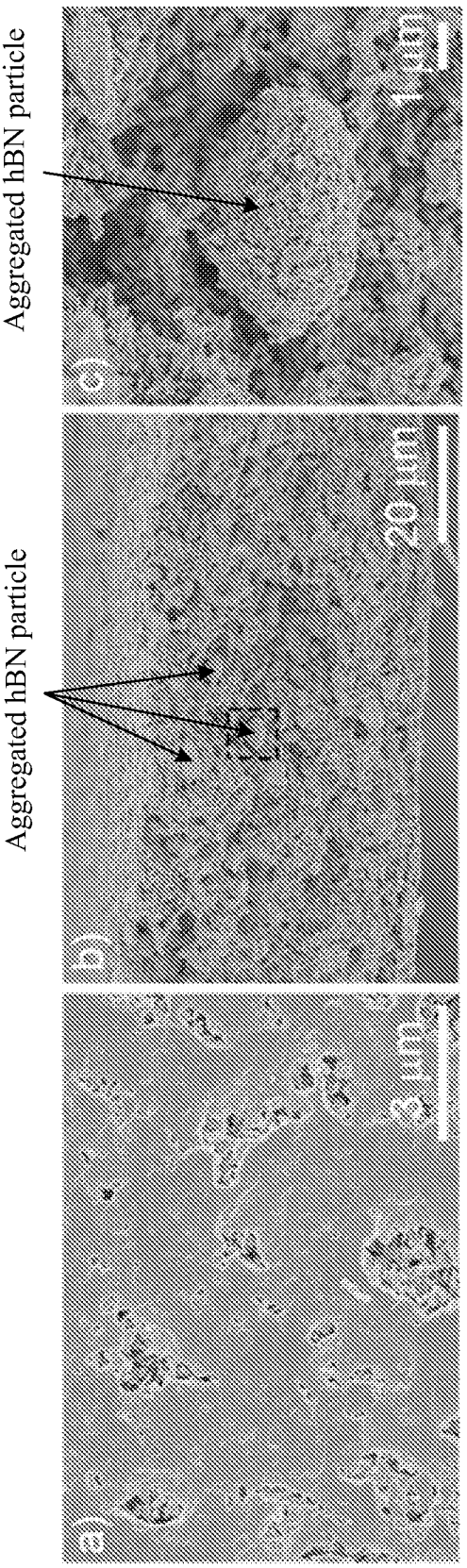
FIGS. 7A-7B show respectively top-view and cross-sectional SEM images of the composite separator fabricated using bulk hBN powders. The cross-sectional image shows bulk hBN aggregates along the thickness.
FIG. 7C is higher magnification of the cross-sectional SEM image shown in FIG. 7B, which highlights one of the bulk hBN aggregates within the microporous structure of the separator.
Figure 8B:
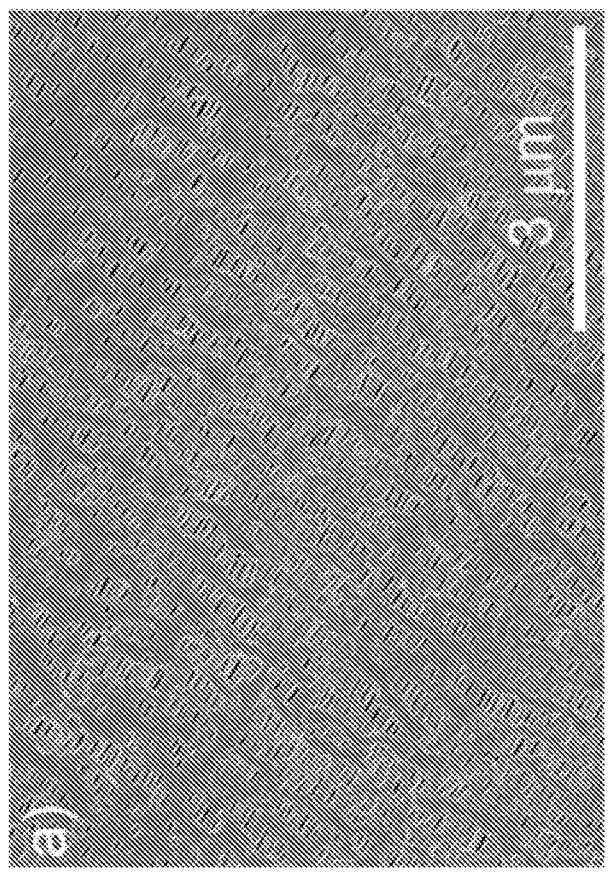
FIGS. 8A-8B shows SEM images of a PP/PE/PP separator and a PE commercial separator, respectively.
Figure 8A:
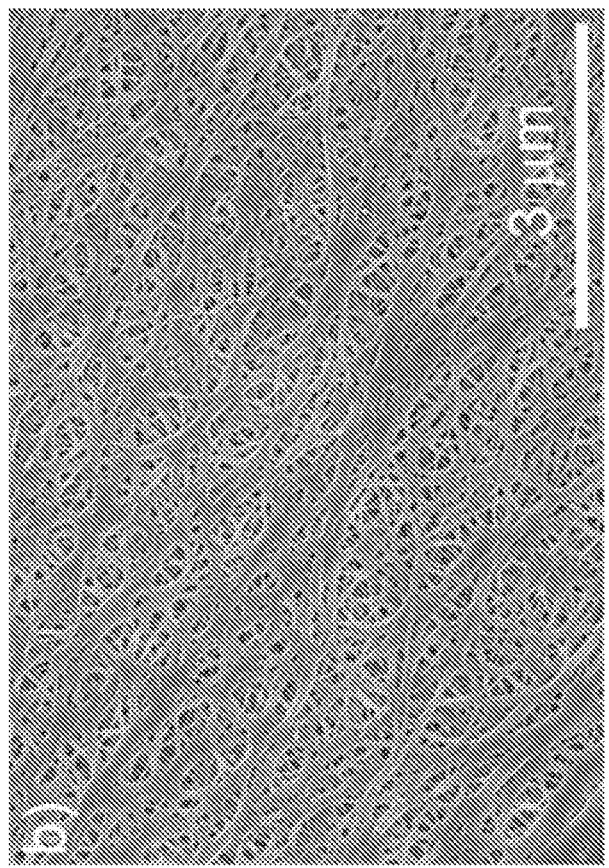

FIG. 1C shows top-view and cross-sectional scanning SEM images of the hBN nanosheet composite separator, which exhibits a highly interconnected porous microstructure both on the surface and along the entire film thickness. It should also be noted that hBN nanosheets are homogeneously dispersed throughout the polymer matrix. An hBN composite separator made from bulk, non-exfoliated hBN was also prepared as a control, which showed a denser surface morphology with fewer pores, as shown in FIG. 7A. Furthermore, aggregated hBN particles are observed throughout the separator thickness for the control sample, as shown in FIGS. 7B-7C, resulting in less homogeneous and thicker membranes.

The exfoliated hBN nanosheets play a critical role in the final porous microstructure. The dry phase-inversion mechanism begins with the initial evaporation of NMP from the as-deposited hBN/PVDF film. Concurrently, a concentration gradient of hBN/PVDF is formed between the NMP and the glycerol, creating an exchange between the solvent and non-solvent. Therefore, the formation of the microporous structure is a result of the drying mechanism during the phase-inversion process and the strong interaction between the non-solvent and the hBN nanosheets. Specifically, the carbonaceous coating on the surface of the hBN nanosheets leads to a favorable interaction between the glycerol and hBN nanosheets through hydrogen bonding (Hansen hydrogen bonding parameter of glycerol=29.3 $(MPa)^{1/2}$), resulting in both a slower non-solvent evaporation rate and the hBN nanosheets and PVDF occupying the glycerol phase. As a result, the final composite film possesses a more homogeneous network of microvoids following the complete removal of the non-solvent.

Characterization of Exfoliated hBN/EC and hBN Nanosheet Composite Separator

The pyrolyzed EC carbon coating on the hBN nanosheets, as shown in FIG. 6, was confirmed by transmission electron microscopy (TEM) that was carried out with a JEOL JEM-2100 microscope at an accelerating voltage of about 200 kV. The thermal behavior of the exfoliated hBN/EC and hBN nanosheet composite separator was characterized by thermogravimetric measurement over a temperature range from about 25° C. to about 600° C. with a ramp of about 10° C. $min^{-1}$ under a synthetic air flow rate of about 50 mL $min^{-1}$ (Mettler Toledo TGA/SDTA851). X-ray photoelectron spectroscopy (XPS) measurements were performed on an ESCALAB 250 $XI^+$ spectrometer (Thermo Fisher Scientific) equipped with an electron flood gun and a scanning ion gun. Analysis of XPS data was performed using Thermo Avantage software. SEM (Hitachi SU8030) images of the hBN nanosheet composite separator surface and cross-section were used to examine the porous microstructure. The porosity of the separators was measured by the n-butanol absorption method. In this example, separator discs (radius=0.5 cm) were weighed before and after immersion in n-butanol (Sigma-Aldrich) for about 1 h. The porosity was then calculated using Equation (1):

$$\text{Porosity}(\%) = \frac{w_1 - w_0}{\rho \times V} \times 100 \tag{1}$$

where $w_1$ and $w_0$ are the weight of wet and dry separator, respectively; $\rho$ is the density of n-butanol; and V is the geometric volume of the separator.

For the electrolyte uptake tests, separator discs (radius = 0.5 cm) were immersed in liquid electrolyte (1.0 M $LiPF_6$ in EC/DEC (50/50 (v/v)), Sigma-Aldrich) for about 2 h. Excessive electrolyte was removed using a Kimtech wipe, followed by weighing of each separator disc. The electrolyte uptake was calculated using Equation (2):

$$\text{Electrolyte uptake}(\%) = \frac{w_1 - w_0}{w_0} - \times 100 \tag{2}$$

where $w_1$ and $w_0$ are the weight of wet and dry separator, respectively.

The wetting properties were determined by contact angle measurements (VCA Optima, AST Products Inc.), where about 3 μL drops of different liquid electrolytes including 1.0 M lithium hexafluorophosphate in ethylene carbonate/diethyl carbonate ($LiPF_6$ in EC/DEC (50/50 (v/v)), Sigma-Aldrich), 0.5 M lithium bis(oxalate)borate (LiBOB, Sigma-Aldrich) in propylene carbonate (PC, Sigma-Aldrich), and 1.0 M lithium bis(trifluoromethanesulfonyl)imide (LiTFSI, Sigma-Aldrich) in 1-ethyl-3-methylimidazolium bis(trifluoromethylsulfonyl)imide (EMIM-TFSI, Sigma-Aldrich) were deposited on the separator surfaces. Droplet images were recorded after about 1 s and about 20 s, and the contact angles were calculated by the sessile drop method.

The ionic conductivity of the hBN separators was measured by electrochemical impedance spectroscopy (EIS).

Coin cells consisting of two parallel stainless-steel disk electrodes of equal size (area=1.86 cm²) sandwiching the separator layer embedded with liquid electrolyte (1.0 M LiPF$_6$ in EC/DEC (50/50 (v/v)), Sigma-Aldrich) were used in the ionic conductivity measurements. The cells were allowed to age overnight prior to electrochemical measurements. Temperature-dependent measurements were carried out using an environmental chamber (model BTL-433, ESPEC) to precisely control sample temperature in the range from −10° C. to 60° C. The cells were allowed to equilibrate for about 30 min at each temperature before the measurement was recorded. Electrochemical measurements were performed using a potentiostat/galvanostat/EIS model SP-300 (Bio-Logic Science Instruments) with an AC amplitude of about 10 mV over a frequency range from about 0.1 Hz to about 1 MHz. The ionic conductivity (σ) was calculated using Equation (3):

$$\sigma = \frac{t}{R \times A} \quad (3)$$

where t corresponds to the thickness of the separator; R is the resistance determined from EIS; and A is the area of the stainless-steel electrode.

The electrochemical stability of the separators was determined by linear sweep voltammetry (potentiostat/galvanostat model SP-300, Bio-Logic Science Instruments) with a scan rate of about 1.0 mV s$^{-1}$ using coin cells comprised of stainless-steel working electrode, separator filled with liquid electrolyte (1.0 M LiPF$_6$ in EC/DEC (50/50 (v/v)), Sigma-Aldrich), and lithium metal foil as counter/reference electrode. The thermal stability of the separators was investigated by heating samples on a hot plate for about 5 min at increasing temperatures up to about 130° C. Photographs were taken after each temperature. Commercial polyolefin-based separators composed by polypropylene/polyethylene/polypropylene (tri-layer PP/PE/PP, Celgard 2325) and polyethylene (single-layer PE, Asahi Kasei) were used as sample controls in the separator property characterization.

Properties of hBN Nanosheet Composite Separator

As summarized in Table 1, the hBN nanosheet composite separator has a porosity of about 59%, whereas the bulk hBN separator possesses a lower porosity of about 44%. Commercially available separators (trilayer polypropylene/polyethylene/polypropylene—PP/PE/PP and single-layer polyethylene—PE) exhibited even lower porosity values of about 38% and about 41%, respectively (Table 1). Porosity is crucial to entrapping a sufficient amount of electrolyte, which facilitates the transport of lithium ions and enables high ionic conductivity. In general, the amount of electrolyte uptake is strongly correlated to the film porosity (Table 1). Specifically, the separator prepared using bulk hBN showed electrolyte uptake of about 224%, which increased to about 353% for the separator containing the carbon-coated, exfoliated hBN nanosheets.

TABLE 1

Summary of typical properties of hBN nanosheet composite separators and commercial polyolefin separators.

| | Thickness (μm) | Porosity (%) | Ionic conductivity (mS cm$^{-1}$) | Electrolyte uptake (%) |
|---|---|---|---|---|
| Nano hBN separator | 25-30 | 59 | 0.95 | 352.6 |
| Bulk hBN separator | 30-40 | 44 | 0.57 | 224.0 |
| PP/PE/PP separator | 25 | 38 | 0.53 | 209.1 |
| PE separator | 20 | 41 | 0.41 | 163.6 |

Figure 2A:
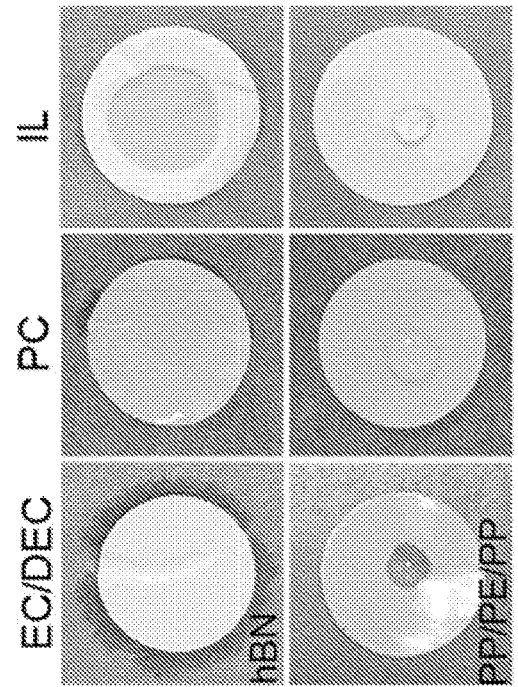
FIG. 2A shows a temperature dependence of the ionic conductivity of the hBN nanosheet composite separator according to embodiments of the invention, compared to a commercial PP/PE/PP separator.
Figure 2B:
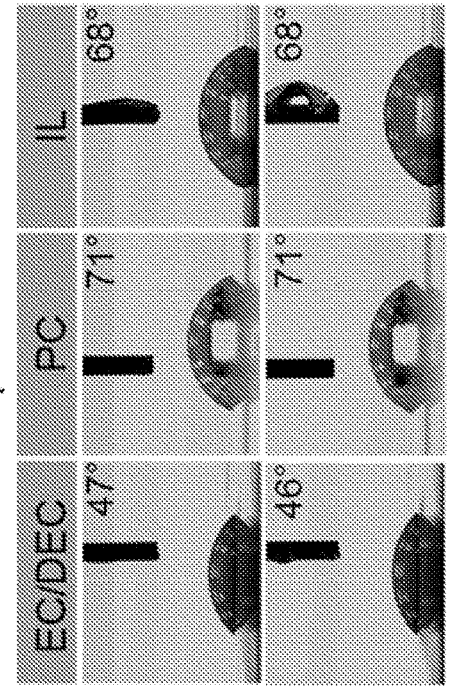
FIGS. 2B-2D show wetting properties of the hBN nanosheet composite separator compared to a commercial PP/PE/PP separator for various lithium-ion battery electrolytes (EC/DEC=LiPF$_6$ in EC/DEC (50/50 (v/v)); PC=LiBOB/PC; IL=LiTFSI in EMIM-TFSI ionic liquid).
Figure 2C:
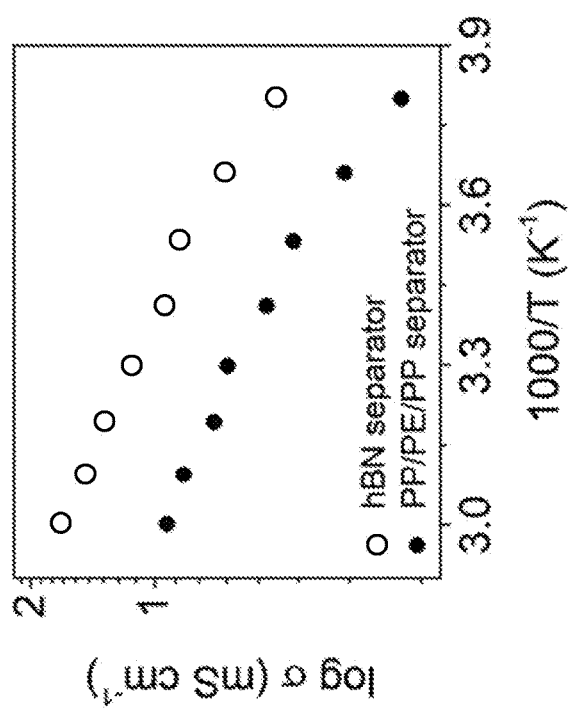
Figure 2D:
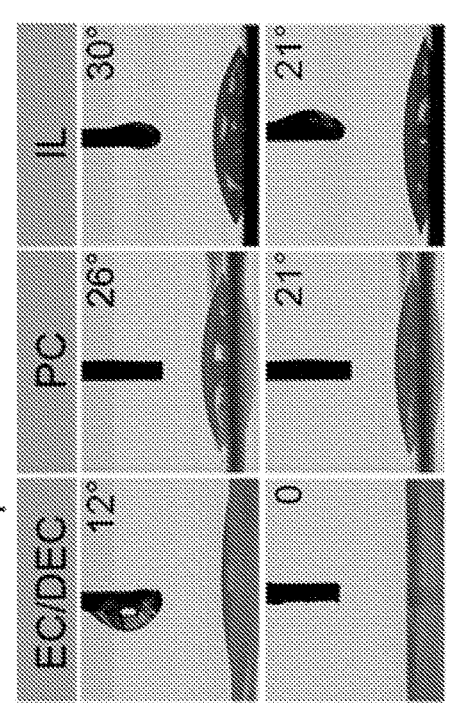
Figure 9:
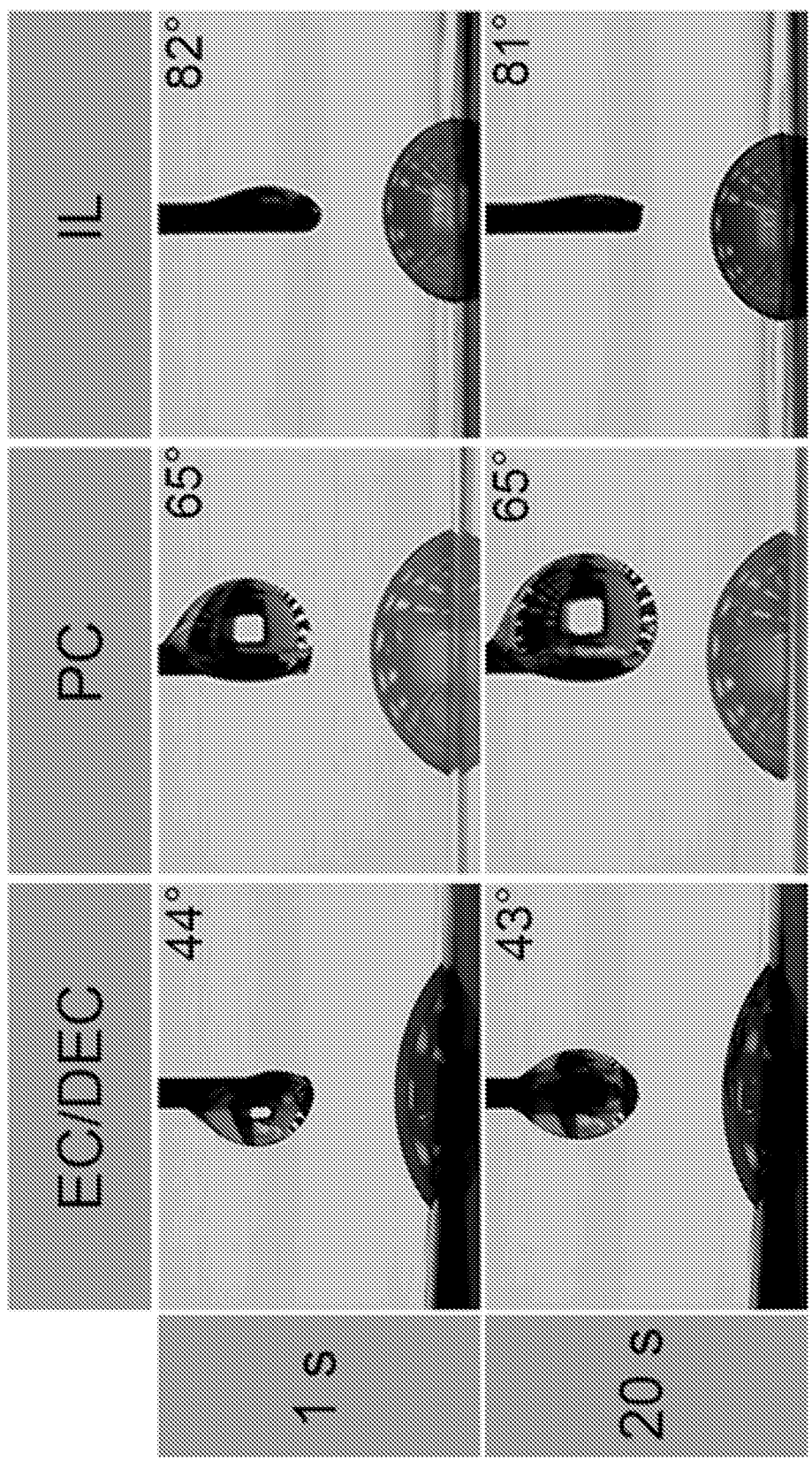
FIG. 9 shows contact angle measurements for the commercial PE separator. In each image, a 3 µL liquid electrolyte drop (EC/DEC=1.0 M LiPF$_6$ in EC/DEC (50/50 (v/v)); PC=0.5 M LiBOB in PC, and IL=1.0 M LiTFSI in EMIM-TFSI ionic liquid) was deposited on the sample surface, and photographs were taken after 1 s and 20 s.
Figure 10:
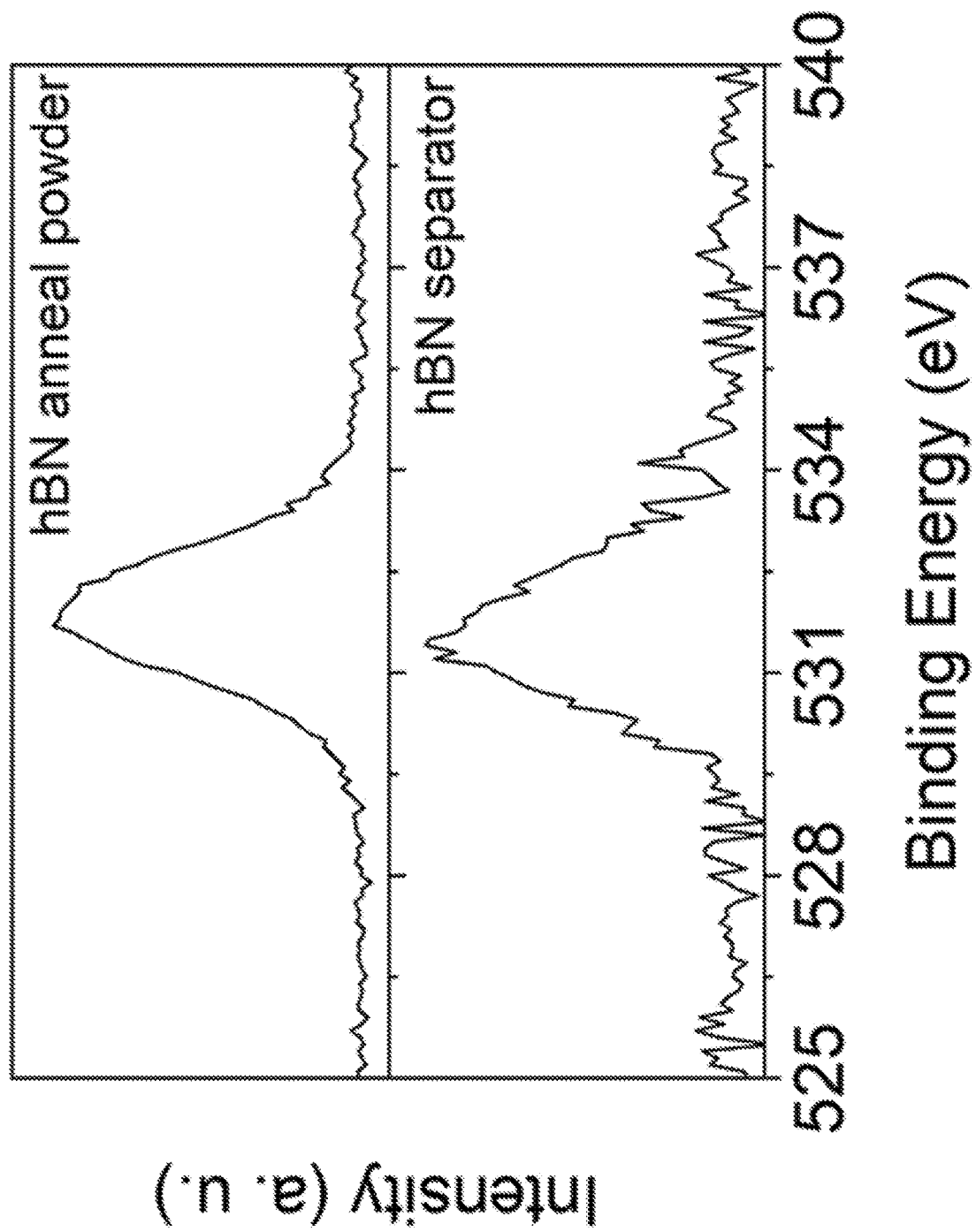
FIG. 10 shows high-resolution O 1 s XPS scan for the hBN/EC annealed powder (upper panel) and hBN nanosheet composite separator (lower panel) according to embodiments of the invention.
Figure 11B:
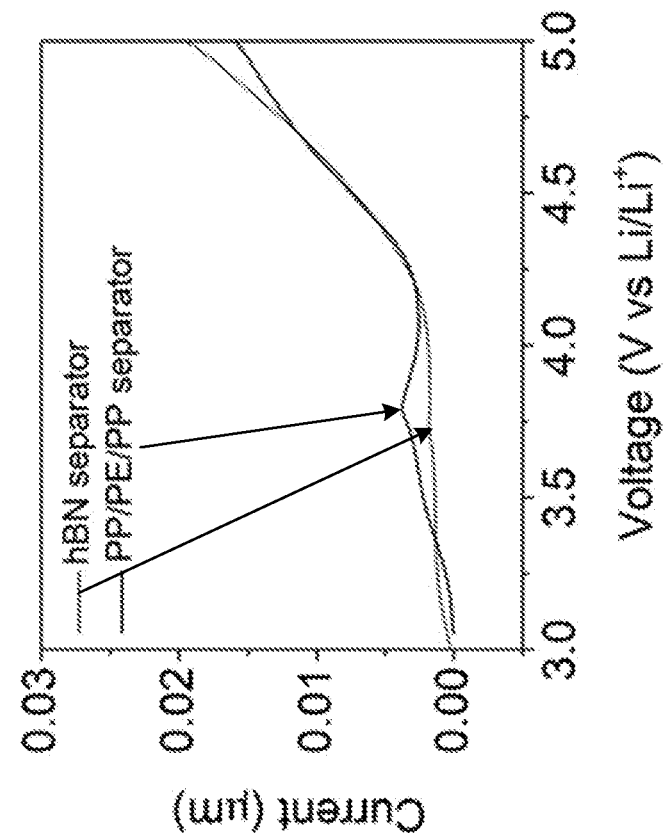
FIGS. 11A-11B show respectively cathodic and anodic electrochemical stability of the hBN nanosheet composite separator according to embodiments of the invention and PP/PE/PP commercial separator as measured by linear sweep voltammetry using coin cells comprised of a stainless-steel working electrode, a separator filled with 1.0 M LiPF$_6$ in EC/DEC (50/50 (v/v)) liquid electrolyte, and lithium metal foil as counter/reference electrode at a scan rate of 1 mV s$^{-1}$.
Figure 11A:
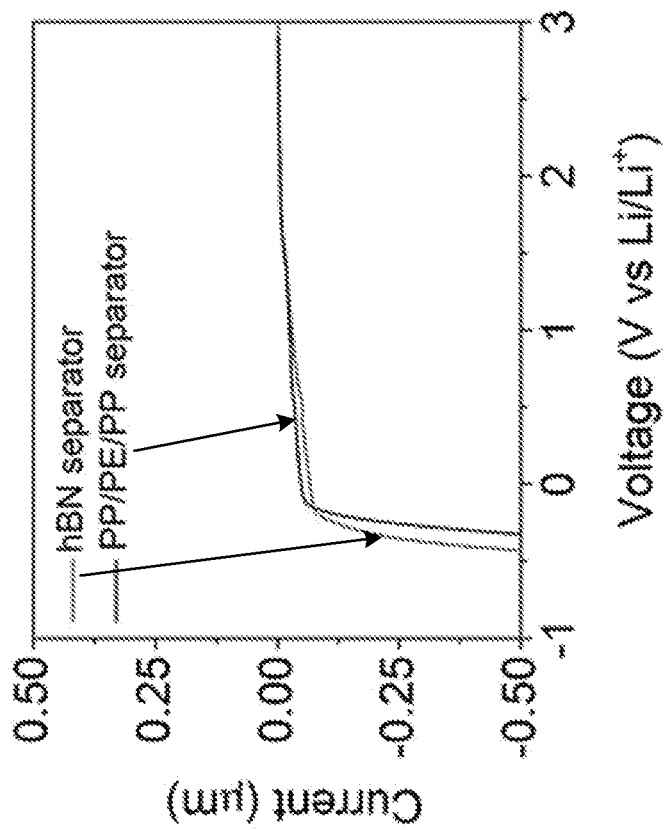
Figure 12:
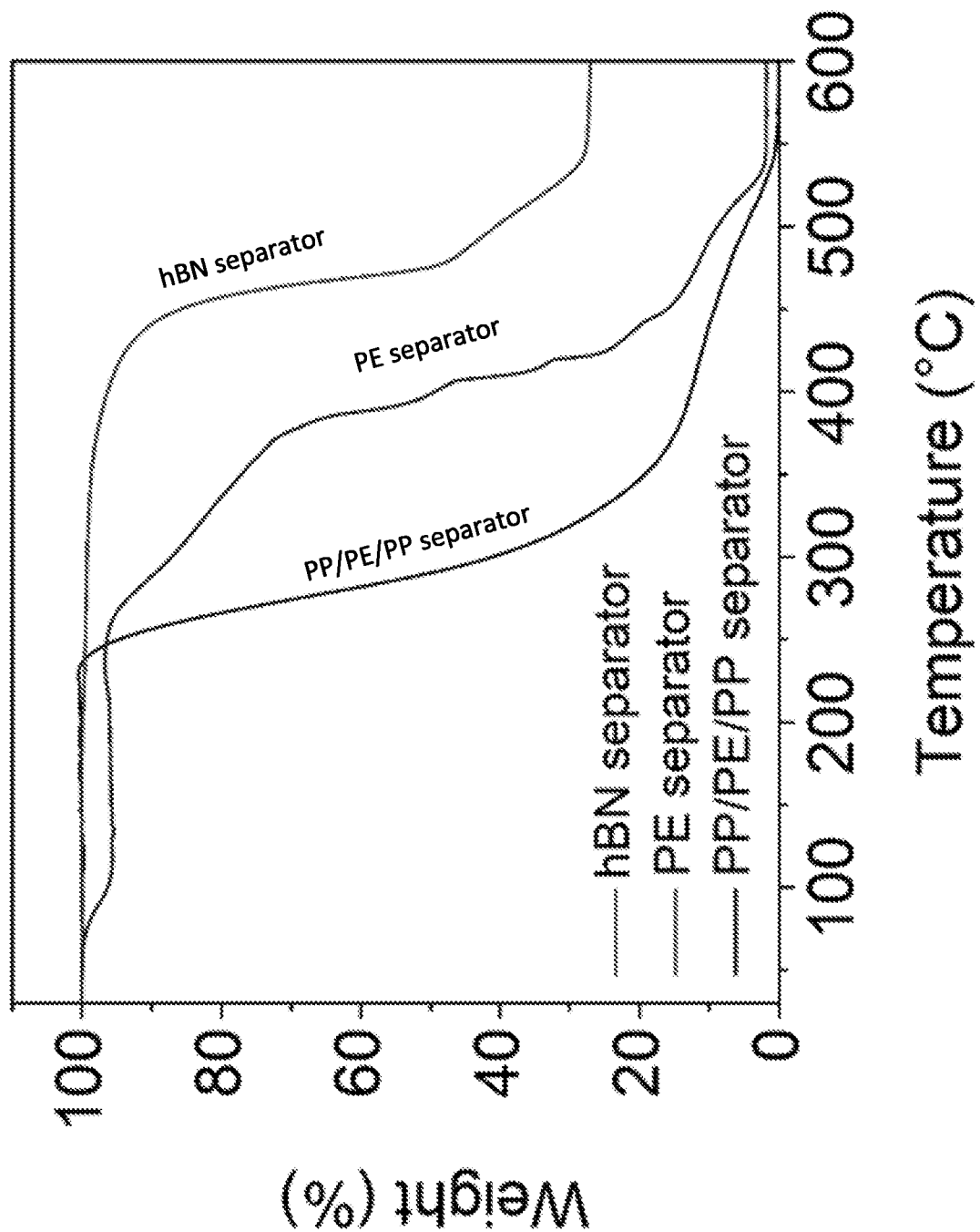
FIG. 12 shows thermogravimetric analysis (TGA) scans of the hBN nanosheet composite separator according to embodiments of the invention and commercial polyolefin separators. Samples were heated from 30° C. to 600° C. at a heating rate of 10° C. min$^{-1}$ under a synthetic air flow rate of 50 mL min$^{-1}$.
Figure 13:
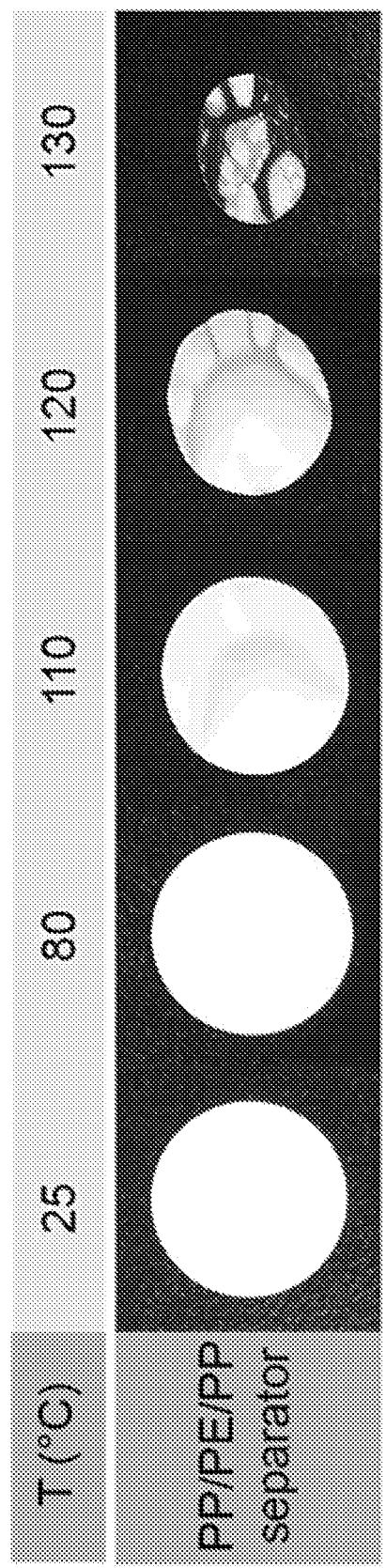
FIG. 13 shows thermal properties of the commercial PP/PE/PP separator. Photographs were taken after the heating samples on a hot plate for 5 min at each temperature.

FIG. 2A shows the temperature dependence of the ionic conductivity for the hBN nanosheet composite separator and the commercial PP/PE/PP separator infiltrated with LiPF$_6$ ethylene carbonate/diethyl carbonate (EC/DEC) liquid electrolyte. At room temperature, the hBN nanosheet composite separator exhibited an ionic conductivity value of about 0.95 mS cm$^{-1}$, outperforming the polyolefin-based separator by almost a factor of two. The expected behavior of increasing ionic conductivity with increasing temperature was confirmed, resulting in ionic conductivities at about 60° C. of about 1.7 mS cm$^{-1}$ and about 0.93 mS cm$^{-1}$ for the hBN nanosheet composite separator and PP/PE/PP separator, respectively. The lowest ionic conductivity values for both separators were observed at about −10° C. However, the hBN separator still outperforms the commercial polymer membrane, yielding an ionic conductivity of about 0.50 mS cm$^{-1}$, which is sufficient for typical LIB applications. Ionic conductivity depends on the concentration of charge carriers and their mobility. The higher ionic conductivity for the hBN nanosheet composite separator at all measured temperatures compared to the commercial PP/PE/PP separator is thus consistent with the high porosity provided by the phase-inversion process. In addition to porosity, the increased ionic conductivity of the hBN nanosheet composite separator can be attributed to its improved electrolyte wettability. The wetting of liquid electrolytes was observed by applying a drop of different liquid electrolytes on the surface of the separators, as shown in FIG. 2B. The hBN nanosheet composite separator showed enhanced wettability for a variety of common electrolytes (e.g., LiPF$_6$ EC/DEC, LiBOB/PC, and LiTFSI/EMIM-TFSI) as confirmed by contact angle measurements, as shown in FIGS. 2C-2D. In particular, the LiPF$_6$ EC/DEC electrolyte was readily absorbed by the hBN nanosheet composite separator, resulting in complete wetting within about 20 s, whereas the commercial PP/PE/PP membrane showed decreased electrolyte absorption with considerably higher contact angle. The same trend was observed for the LiBOB/PC electrolyte, which rapidly infiltrated the hBN nanosheet composite separator, resulting in a low contact angle of about 21°. In contrast, the polyolefin membrane showed a higher contact angle of about 71° that did not decline after about 20 s. The improved wettability of the hBN nanosheet composite separator is consistent with the expected favorable interaction between the carbon-coated hBN nanosheets and the carbonate electrolyte solvents. In addition, the presence of highly polar C—F bonds in the polymer matrix reinforces the electrolyte wettability. The inferior wettability of the PP/PE/PP separators can also be attributed to the large difference in polarity between the polyolefins and the electrolyte. Relatively poor electrolyte wettability was also observed for the single-layer PE separator, as shown in FIG. 9.

The wettability of the separators towards ionic liquid electrolytes was also examined. The hBN nanosheet composite separator was effectively infiltrated with LiTFSI/ EMIM-TFSI ionic liquid electrolyte, showing a contact angle of about 30° that dropped to about 21° within about 20 s. The wetting properties of LiTFSI/EMIM-TFSI ionic liquid are influenced by the large polarity and non-polarity of the constituent ions. In this case, the TFSI⁻ anion is an amphiphile with strong hydrophobic as well as hydrophilic moieties, and is capable of forming hydrogen bonds with the EMIM⁺ cation. Therefore, the wetting properties of the hBN nanosheet separators towards LiTFSI/EMIM-TFSI is mostly correlated to the favorable interactions of the electrolyte with the carbon-coated hBN nanosheets and the polar PVDF polymer. Since the PP/PE/PP membrane is comprised of nonpolar polyolefins, this separator showed much weaker wettability for LiTFSI/EMIM-TFSI, with a constant contact angle value of about 68° that did not decline with time.

Figure 3A:
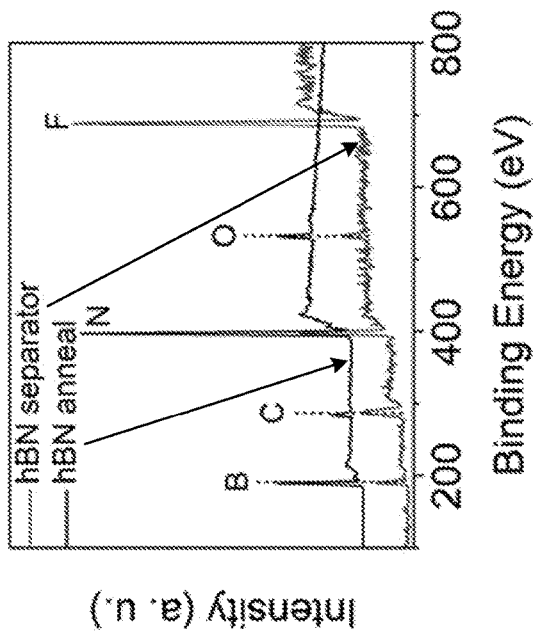
FIGS. 3A-3D show annealed hBN/EC powder and hBN nanosheet composite separator surface properties according to embodiments of the invention.
Figure 3B:
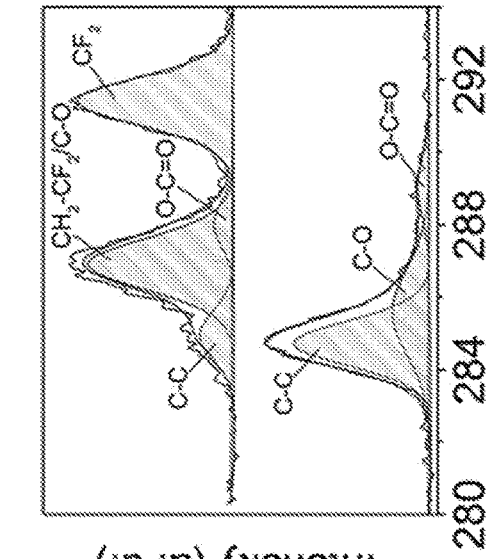
Figure 3C:
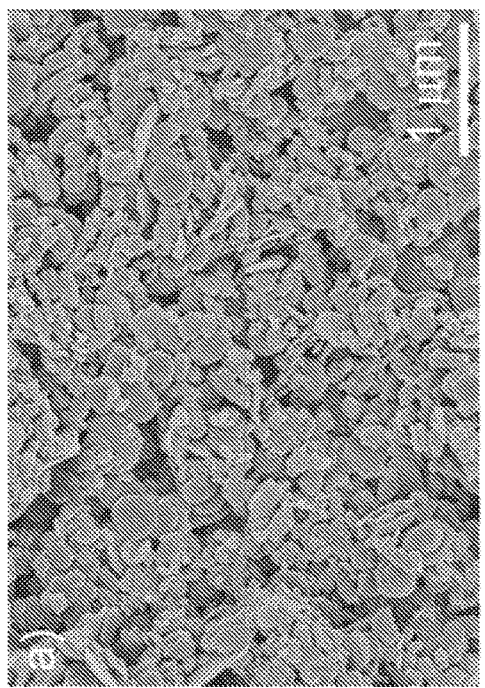
Figure 3D:
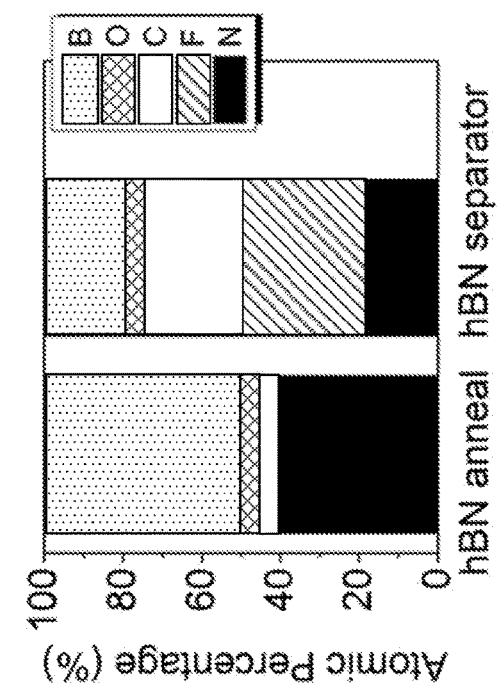

Since the carbon coating on the hBN nanosheets are critical to the formation and wettability of the composite separator, further analysis was performed to elucidate this surface chemistry shown in FIGS. 3A-3D. FIG. 3A shows the nanoscale morphology of the carbon-coated hBN nanosheets as observed by SEM, which matches the morphology of the hBN nanosheets on the surface of the hBN nanosheet composite separator shown in FIG. 1A. FIGS. 3B-3C presents X-ray XPS surface characterization of the carbon-coated hBN nanosheets and the hBN nanosheet composite separator. The XPS survey spectra, as shown in FIG. 3B, identified all elements comprising both sample surfaces. Peaks assigned to boron, nitrogen, carbon, and oxygen are present in both samples, whereas an additional fluorine peak at approximately 688 eV is observed for the hBN nanosheet composite separator due to the presence of fluorine in PVDF. The relative atomic percentages of boron, nitrogen, carbon, oxygen, and fluorine obtained from XPS survey scans are provided in FIG. 3C. Both samples exhibited spectral features consistent with the presence of pyrolyzed EC carbon coating on the hBN nanosheets, which are exclusively composed of C and O. The hBN nanosheet composite separator showed suppressed atomic percentages of B and N owing to the blend with the PVDF polymer, which in turn resulted in higher atomic percentages of C and F. The relative content of O is approximately constant, reflecting the presence of oxygen-containing moieties in the carbon coating on the surface of the hBN nanosheets.

The high-resolution C is spectrum of the carbon-coated hBN nanosheets was further deconvoluted into three components assigned to carbon in different chemical states: C—C (about 285 eV), C—O (about 286 eV), and O—C=O (about 289 eV). The C is spectrum of the hBN nanosheet composite separator was fitted considering four different contributions that can be associated with C—C (about 285 eV), $CH_2$—$CF_2$/C—O (about 287 eV), O—C=O (about 288 eV), and $CF_2$ (about 291 eV). This spectral fitting confirmed that the coating of the hBN nanosheets includes carbonaceous species composed of C—C and oxygen-containing groups, which promote favorable electrolyte interactions that ultimately enhance electrochemical properties.

hBN Nanosheet Composite Separator Battery

To assess electrochemical performance, the separators were incorporated into lithium-ion batteries (LIBs) in a half-cell configuration using $Li_4Ti_5O_{12}$ (LTO) electrodes and $LiPF_6$ in EC/DEC liquid electrolyte.

The LTO electrodes were fabricated by coating a slurry containing about 80% active material ($Li_4Ti_5Oi_2$ nanopowder, Sigma-Aldrich), about 10% carbon black, and about 10% PVDF binder on an aluminum foil as current collector. LTO|Li half-cells were assembled using the hBN nanosheet composite separator and 1.0 M $LiPF_6$ in EC/DEC (50/50 (v/v)) as the electrolyte and cycled on a BT-2143 battery cycler (Arbin Instruments). Control cells were assembled using Celgard 2325 as the separator. Rate performance studies were tested for 5 cycles at 0.1 C, 0.5 C, 2.5 C, 5 C, and 0.1 C for a voltage range window of about 1.0-2.5 V. Cycling performance tests were carried out at constant current rate of 0.5 C for 100 cycles. For high-temperature battery measurements, 1.0 M LiTFSI in EMIM-TFSI ionic liquid was used as the electrolyte. Control cells were assembled using single-layer PE separators (Asahi Kasei). LTO|Li half-cells were cycled at a constant 0.2 C current rate for about 15 cycles inside an environmental chamber (model BTL-433, ESPEC) at an elevated temperature of about 120° C. All battery cells were assembled in an argon-filled glove box and aged overnight before testing.

Figure 4A:
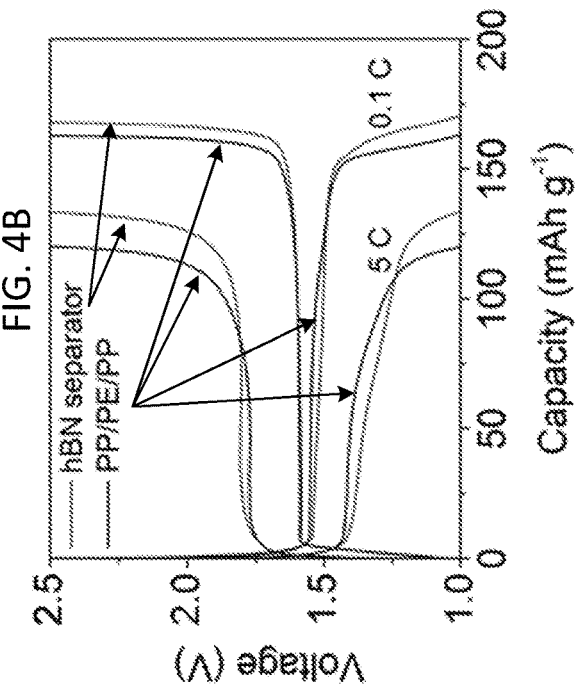
FIGS. 4A-4D show electrochemical properties of the hBN nanosheet composite separator according to embodiments of the invention and the commercial PP/PE/PP separator using lithium titanate (LTO) anode electrodes and 1.0 M LiPF$_6$ in EC/DEC (50/50 (v/v)) liquid electrolyte at room temperature.
Figure 4B:
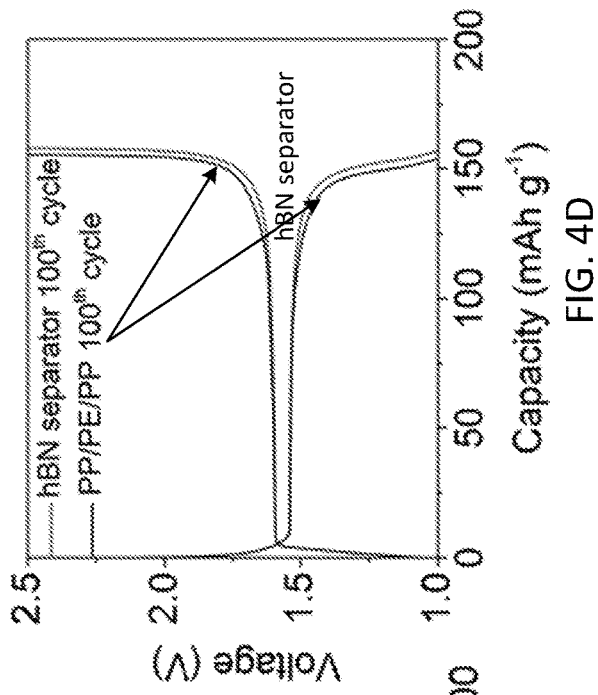
Figure 4C:
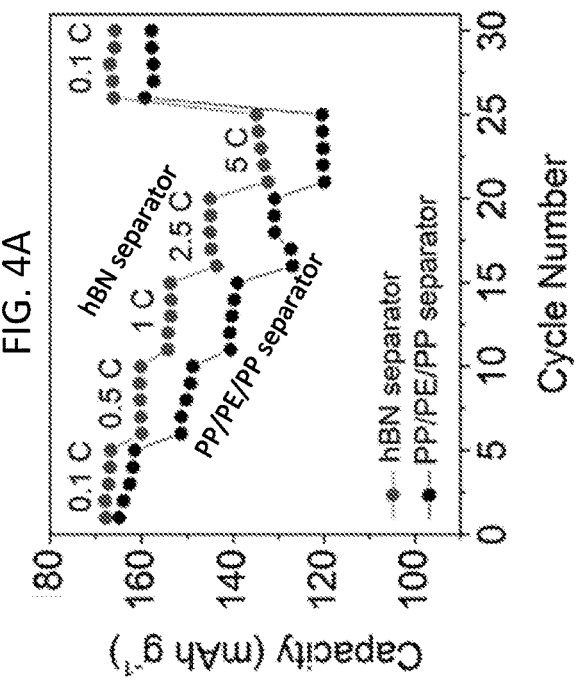
Figure 4D:
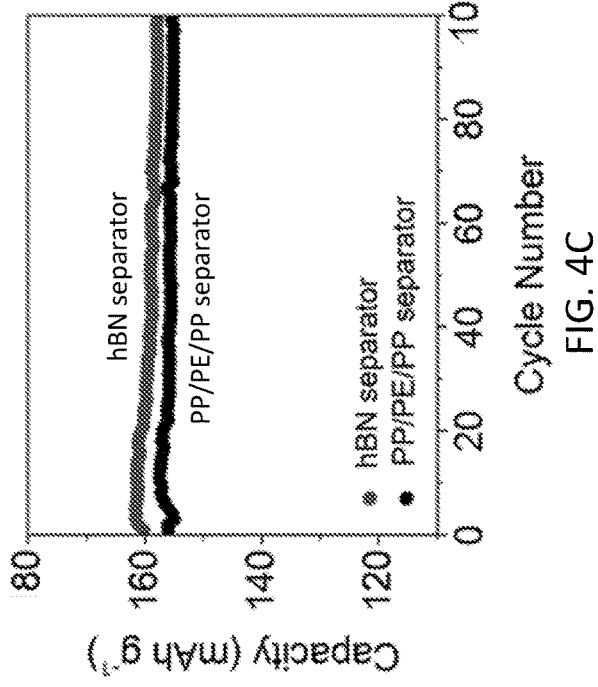

FIG. 4A shows the rate capability test, with current rates ranging from 0.1 C to 5 C for different cells made with the hBN nanosheet composite separator and the commercial PP/PE/PP separator. Both cells showed stable capacities and flat voltage profiles at each tested C-rate. Consistent with its higher ionic conductivity, the hBN nanosheet composite separator yielded a higher capacity at all current rates compared to the commercial PP/PE/PP separator. The corresponding charge-discharge voltage profiles in FIG. 4B showed capacities of about 171 mAh g⁻¹ and about 162 mAh g⁻¹ at 0.1 C for the hBN nanosheet composite separator and PP/PE/PP membrane, respectively. At high rate where ionic conductivity plays a more limiting role, the hBN nanosheet composite separator extends its advantage over the PP/PE/PP membrane, particularly showing a 5C capacity of about 134 mAh g⁻¹ compared to about 120 mAh g⁻¹. The LTO half-cells were also subjected to cycle life testing at 0.5 C as shown in FIG. 4C. The hBN nanosheet composite separator showed improved performance in comparison to the commercial PP/PE/PP separator throughout the entire test, revealing high stability and retained capacity of about 158 mAh g⁻¹ after about 100 cycles. The corresponding voltage profiles in FIG. 4D illustrate the stable charge-discharge behavior and minimal capacity loss after extended cycling.

Figure 5A:
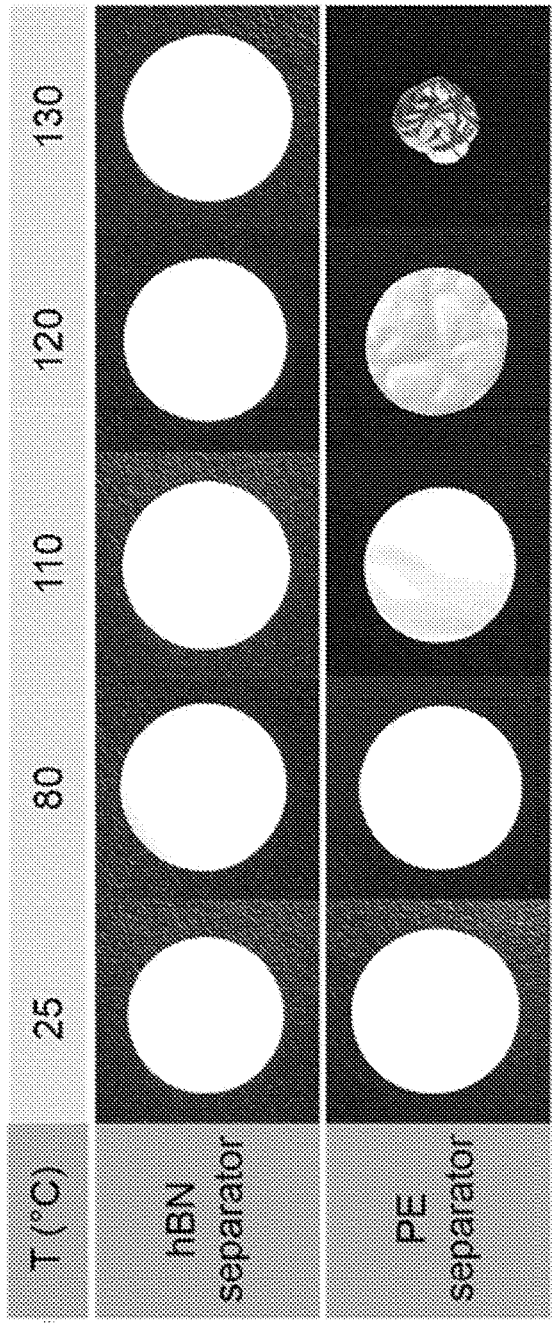
FIGS. 5A-5C show physical and electrochemical properties of the hBN nanosheet composite separator according to embodiments of the invention and commercial PE separator at increasing temperatures.

The thermal stability behavior of the hBN nanosheet composite separator and the commercial PE separator is shown in FIG. 5A, where both samples were subjected to identical heating conditions. It is evident that the hBN nanosheet composite separator has excellent thermal stability up to about 130° C. with no shrinkage or other observable changes, whereas the commercial PE separator undergoes irreversible loss of structural integrity that becomes more pronounced as the temperature is increased. The improved thermal stability of the hBN separator is attributable to the refractory nature of hBN nanosheets, which also act as promising flame retardant nanoadditives for polymers. Indeed, the hBN nanosheet composite separators were also stable upon exposure to a flame, whereas the polyolefin-based commercial separators burned and completely lost structural integrity as shown in FIGS. 14A-14C.

Figure 5C:
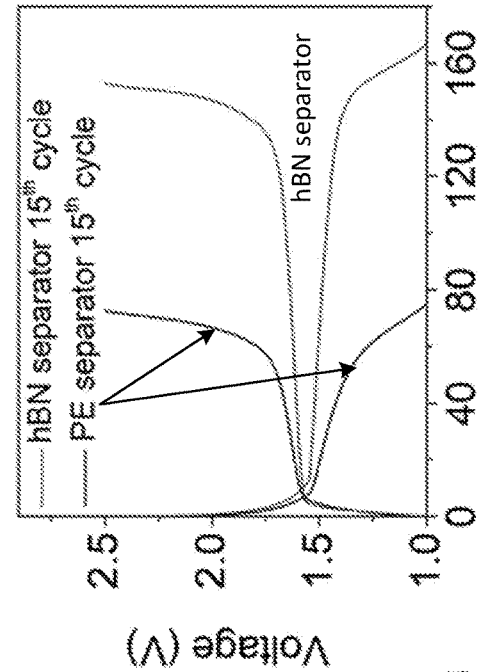
Figure 5B:
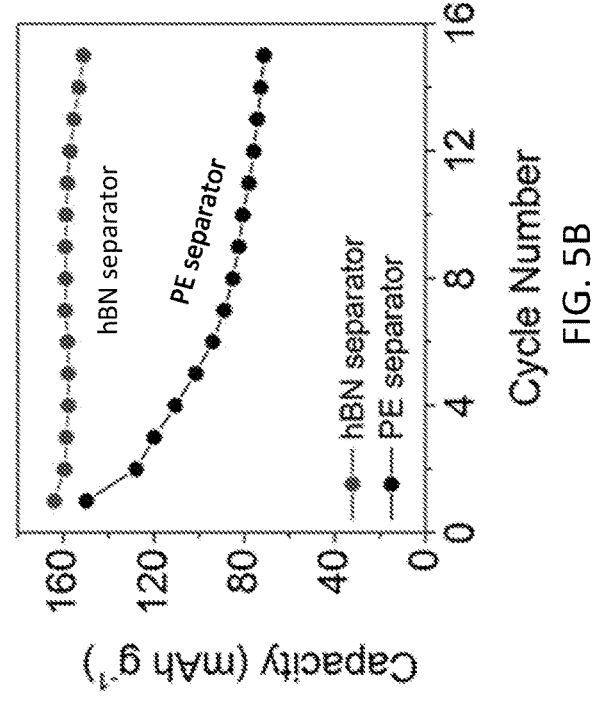

Conventional liquid electrolytes utilizing $LiPF_6$ as the conducting salt dissolved in liquid carbonate-based electrolytes suffer from poor thermal stability due to hydrolyzation and degradation of salt and/or solvent components, which results in side reactions that compromise electrodes and induce severe capacity fade. Consequently, thermally stable LiTFSI/EMIM-TFSI ionic liquid electrolytes were used for high-temperature battery testing. In particular, the LiTFSI salt presents higher thermal stability and low sensitivity to hydrolyzation while the EMIM-TFSI ionic liquid overcomes safety concerns due to negligible vapor pressure and non-flammability. Since this ionic liquid electrolyte did not wet the PP/PE/PP separator, as shown in FIG. 2D, the control cell in this case was assembled using the PE separator. FIGS. 5B-5C show the cycling stability and corresponding voltage profiles for LTO half-cells using the hBN nanosheet composite separator and PE separator at 0.2 C and an operating temperature of about 120° C. The high-temperature cycling performance of the hBN nanosheet composite separator clearly exceeds the PE separator with more than double the capacity retention after 15 cycles. These results underscore the potential of the hBN nanosheet composite separators to enhance LIB safety in addition to enabling high-temperature applications for LIBs such as sterilizable medical devices, subsurface exploration devices, and aerospace technologies.

In summary, the invention demonstrates, among other things, the fabrication of free-standing LIB composite separators based on hBN nanosheets prepared using dry phase-inversion. The hBN nanosheets were prepared by scalable liquid-phase exfoliation in the presence of EC as a polymer stabilizer. Subsequent EC pyrolysis led to the formation of a nanoscale carbonaceous coating on the hBN nanosheets that facilitated favorable interactions with the PVDF polymer matrix and promoted electrolyte wettability. The resulting high-porosity hBN nanosheet composite membranes possessed high ionic conductivity that enhanced LIB rate capability and cycling stability compared to conventional polyolefin separators. In addition, the high thermal stability of the hBN nanosheet composite separators allowed effective LIB operation at high temperatures up to about 120° C. Overall, this invention establishes a promising strategy for producing LIB separators that enhance electrochemical performance, improve safety, and extend operating temperature range.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1] B. Scrosati, J. Hassoun, Y. -K. Sun, *Energy Environ. Sci.* 2011, 4, 3287.

[2] J. M. Tarascon, M. Armand, *Nature,* 2001, 414, 359.

[3] J. B. Goodenough, K. -S. Park, *J. Am. Chem. Soc.* 2013, 135, 1167.

[4] M. Winter, R. J. Brodd, *Chem. Rev.* 2004, 104, 4245.

[5] X. Huang, J. Solid State *Chem.* 2011, 15, 649.

[6] M. F. Lagadec, R. Zahn, V. Wood, Nat. *Energy* 2019, 4, 16.

[7] S. S. Zhang, *J. Power Sources* 2007, 164, 351.

[8] P. Arora, Z. Zhang, *Chem. Rev.* 2004, 104, 4419.

[9] C. Martinez-Cisneros, C. Antonelli, B. Levenfeld, A. Varez, J. Y. Sanchez, *Electrochim. Acta* 2016, 216, 68.

[10] W. Jiang, Z. Liu, Q. Kong, J. Yao, C. Zhang, P. Han, G. Cui, *Solid State Ion.* 2013, 232, 44.

[11] H. Li, D. Wu, J. Wu, L.-Y. Dong, Y.-J. Zhu, X. Hu, *Adv. Mater.* 2017, 29, 1703548.

[12] Y. Zhai, K. Xiao, J. Yu, B. Ding, *Electrochim. Acta* 2015, 154, 219.

[13] V. Deimede, C. Elmasides, *EnergyTechnol.* 2015, 3, 453.

[14] H. Lee, M. Yanilmaz, O. Toprakci, K. Fu, X. Zhang, *Energy Environ. Sci.* 2014, 7, 3857.

[15] M. -H. Ryou, Y. M. Lee, J.-K. Park, J. W. Choi, *Adv. Mater.* 2011, 23, 3066.

[16] J. Y. Kim, Y. Lee, D. Y. Lim, *Electrochim. Acta* 2009, 54, 3714.

[17] J. M. Ko, B. G. Min, D.-W. Kim, K. S. Ryu, K. M. Kim, Y. G. Lee, S. H. Chang, *Electrochim. Acta* 2004, 50, 367.

[18] X. Zhu, X. Jiang, X. Ai, H. Yang, Y. Cao, *ACS Appl. Mater. Interfaces* 2015, 7, 24119.

[19] H. Jeon, D. Yeon, T. Lee, J. Park, M.-H. Ryou, Y. M. Lee, *J. Power Sources* 2016, 315, 161.

[20] J. Dai, C. Shi, C. Li, X. Shen, L. Peng, D. Wu, D. Sun, P. Zhang, J. Zhao, *Energy Environ. Sci.* 2016, 9, 3252.

[21] M. Wang, X. Chen, H. Wang, H. Wu, X. Jin, C. Huang, *J. Mater. Chem. A* 2017, 5, 311.

[22] L. Jiang, X. Zhang, Y. Chen, L. Qiao, X. Lu, X. Tian, *Mater. Chem. Phys.* 2018, 219, 368.

[23] A. J. Blake, R. R. Kohlmeyer, J. O. Hardin, E. A. Carmona, B. Maruyama, J. D. Berrigan, H. Huang, M. F. Durstock,*Adv. Energy Mater.* 2017, 7, 1602920.

[24] D. Deepika, L. H. Li, A. M. Glushenkov, S. K. Hait, P. Hodgson, Y. Chen, *Sci. Rep.* 2014, 4, 7288.

[25] C. R. Dean, A. F. Young, I. Meric, C. Lee, L. Wang, S. Sorgenfrei, K. Watanabe, T. Taniguchi, P. Kim, K. L. Shepard, J. Hone, *Nat. Nanotechnol.* 2010, 5, 722.

[26] Y. Liu, Y. Qiao, Y. Zhang, Z. Yang, T. Gao, D. Kirsch, B. Liu, J. Song, B. Yang, L. Hu, *Energy Storage Mater.* 2018, 12, 197.

[27] M. Waqas, S. Ali, W. Lv, D. Chen, B. Boateng, W. He, *Adv. Mater. Interfaces* 2019, 6, 1801330.

[28] W. Luo, L. Zhou, K. Fu, Z. Yang, J. Wan, M. Manno, Y. Yao, H. Zhu, B. Yang, L. Hu, *Nano Lett.* 2015, 15, 6149.

[28] L. Niu, J. N. Coleman, H. Zhang, H. Shin, M. Chhowalla, Z. Zheng, *Small* 2016, 12, 272.

[30] H. Xie, Z. Tang, Z. Li, Y. He, H. Wang, Y. Liu, *J. Solid State Electrochem.* 2008, 12, 1497.

[31] C. M. Hansen, *Hansen Solubility Parameters: A User's Handbook*, CRC Press, Boca Raton, Fla., USA 2007.

[32] P. Raghavan, X. Zhao, J.-K. Kim, J. Manuel, G. S. Chauhan, J.-H. Ahn, C. Nah, *Electrochim. Acta* 2008, 54, 228.

[33] L. Wang, N. Deng, J. Ju, G. Wang, B. Cheng, W. Kang, *Electrochim. Acta* 2019, 300, 263

[34] Y. Xie, H. Zou, H. Xiang, R. Xia, D. Liang, P. Shi, S. Dai, H. Wang, *J. Membrane Sci.* 2016, 503, 25.

[35] H. Kato, K. Nishikawa, Y. Koga, *J. Phys. Chem. B* 2008, 112, 2655.

[36] Z. Liu, T. Cui, T. Lu, M. S. Ghazvini, F. Endres, *J. Phys. Chem. C* 2016, 120, 20224.

[37] K. Dong, S. Zhang, D. Wang, X. Yao, *J. Phys. Chem. A* 2006, 110, 9775.

[38] S. Zhang, J. Cao, N. Ma, M. You, X. Wang, J. Meng, *Appl. Surf. Sci.* 2018, 428, 41.

[39] N. Kostoglou, K. Polychronopoulou, C. Rebholz, *Vacuum* 2015, 112, 42.

[40] B. Yu, W. Xing, W. Guo, S. Qiu, X. Wang, S. Lo, Y. Hu, *J. Mater. Chem. A* 2016, 4, 7330.

[41] J. Kalhoff, G. G. Eshetu, D. Bresser, S. Passerini, *ChemSusChem* 2015, 8, 2154.

[42] Z. Lu, L. Yang, Y. Guo, *J. Power Sources* 2006, 156, 555.

[43] J. Le Bideau, L. Viau, A. Vioux, *Chem. Soc. Rev.* 2011, 40, 907.

[44] M. J. Marczewski, B. Stanje, I. Hanzu, M. Wilkening, P. Johansson, *Phys. Chem. Chem. Phys.* 2014, 16, 12341.

[45] J. Ding, Y. Kong, P. Li, J. Yang, *J. Electrochem. Soc.* 2012, 159, A1474.

What is claimed is:

1. A composite film usable as a separator of an electrochemical device, comprising:
   carbon-coated hexagonal boron nitride (hBN) nanosheets and at least one polymer, wherein said at least one polymer comprises one or more electrically insulating and electrochemically inert polymers, wherein the hBN nanosheets are uniformly dispersed within a matrix of said at least one polymer to achieve a porous microstructure with a porosity in a range of about 47-70%,
   wherein the carbon-coated hBN nanosheets comprise exfoliated hBN nanosheets; and
   wherein the exfoliated hBN nanosheets are formed from bulk hBN by a liquid-phase shear exfoliation process with a polymer stabilizer of ethyl cellulose, and followed by thermal pyrolysis, thereby resulting a carbon coating on the hBN nanosheets.

2. The composite film of claim 1, wherein the carbon coating of the hBN nanosheets comprises carbonaceous species composed of C—C and oxygen-containing groups.

3. The composite film of claim 1, wherein the composite film is thermally stable with structural integrity at an operation temperature up to about 145° C.

4. The composite film of claim 1, wherein said at least one polymer comprises polyvinylidene fluoride (PVDF), poly(vinylidene fluoride-co-hexafluoropropylene) (PVDF-HFP), poly(vinylidene fluoride-co-trifluoroethylene) (PVDF-TrFE), polyethylene oxide (PEO), polyphenylsulfone (PPSU), perfluorosulfonic acid (PFSA), poly(acrylic acid) (PAA), polyacrylonitrile (PAN), polyethylene terephthalate (PET), polyimide (PI), poly(m-phenyleneisophthalamide) (PMIA), polymethylmethaacrylate (PMMA), polyurethane (PU), polyurethane acrylate (PUA), poly(ethylene glycol) diacrylate (PEGDA), polyvinylchloride (PVC), polystyrene (PS), polyethylene (PE), polypropylene (PP), poly(vinyl alcohol) (PVA), polytetrafluoroethylene (PTFE), polyethylene terephthalate (PET), polydopamine (PDA), polyetherimide (PEI), poly(hydroxyethyl acrylate-co-acrylonitrile) (PHEA-co-AN), poly(methyl methacrylate-acrylonitrile-vinyl acetate (PMMA-AN-VAc), poly(acrylonitrile-co-butyl acrylate) (PAN-co-BuA), polyacrylonitrile-methyl methacrylate (PAN-MMA), polybenzoxazole, polyfluorosilicones, or combinations of them.

5. The composite film of claim 4, wherein said at least one polymer comprises PVDF.

6. The composite film of claim 5, wherein the composite film has a ratio of the hBN nanosheets to PVDF is about 1:1 by weight.

7. A battery, comprising a separator comprising the composite film according to claim 1.

8. The battery of claim 7, wherein the separator has ionic conductivity that increases as a temperature increases.

9. The battery of claim 8, wherein the ionic conductivity is in a range of about 0.75-1.25 mS cm$^{-1}$ at room temperature, and about 1.36-2.0 mS cm$^{-1}$ at the temperature of about 60° C.

10. The battery of claim 7, wherein the separator has an electrolyte uptake in a range of about 280-420%.

11. A fuel cell, comprising a membrane comprising the composite film according to claim 1.

12. An electrochemical device, comprising a member comprising the composite film according to claim 1.

13. A composite material, comprising:
   carbon-coated hexagonal boron nitride (hBN) nanosheets and at least one polymer, said at least one polymer being one or more electrically insulating and electrochemically inert polymers, wherein the composite material possesses porosity in a range of about 47-70%, electrolyte wettability, and thermal stability,
   wherein the carbon-coated hBN nanosheets comprise exfoliated hBN nanosheets; and
   wherein the exfoliated hBN nanosheets are formed from bulk hBN by a liquid-phase shear exfoliation process with a polymer stabilizer of ethyl cellulose, and followed by thermal pyrolysis, thereby resulting in a carbon coating on the hBN nanosheets.

14. The composite material of claim 13, wherein the carbon coating of the hBN nanosheets comprises carbonaceous species composed of C—C and oxygen-containing groups.

15. The composite material of claim 13, wherein said at least one polymer comprises polyvinylidene fluoride (PVDF), poly(vinylidene fluoride-co-hexafluoropropylene) (PVDF-HFP), poly(vinylidene fluoride-co-trifluoroethylene) (PVDF-TrFE), polyethylene oxide (PEO), polyphenylsulfone (PPSU), perfluorosulfonic acid (PFSA), poly(acrylic acid) (PAA), polyacrylonitrile (PAN), polyethylene terephthalate (PET), polyimide (PI), poly(m-phenyleneisophthalamide) (PMIA), polymethylmethaacrylate (PMMA), polyurethane (PU), polyurethane acrylate (PUA), poly(ethylene glycol) diacrylate (PEGDA), polyvinylchloride (PVC), polystyrene (PS), polyethylene (PE), polypropylene (PP), poly(vinyl alcohol) (PVA), polytetrafluoroethylene (PTFE), polyethylene terephthalate (PET), polydopamine (PDA), polyetherimide (PEI), poly(hydroxyethyl acrylate-co-acrylonitrile) (PHEA-co-AN), poly(methyl methacrylate-acrylonitrile-vinyl acetate (PMMA-AN-VAc), poly(acrylonitrile-co-butyl acrylate) (PAN-co-BuA), polyacrylonitrile-methyl methacrylate (PAN-MMA), polybenzoxazole, polyfluorosilicones, or combinations of them.

16. The composite material of claim 15, wherein said at least one polymer comprises PVDF.

17. The composite material of claim 16, wherein the composite material has a ratio of the hBN nanosheets to PVDF is about 1:1 by weight.

18. An electrochemical device, comprising a member formed of the composite material according to claim 13.

19. The electrochemical device of claim 18, wherein the electrochemical device is a battery, a supercapacitor, or a fuel cell.

* * * * *